United States Patent
Nogawa et al.

(10) Patent No.: US 10,221,793 B2
(45) Date of Patent: Mar. 5, 2019

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventors: Shinichiro Nogawa, Mishima (JP); Hiroaki Mizoguchi, Mishima (JP); Yasuyuki Irisawa, Susono (JP); Shintaro Hotta, Susono (JP); Masanori Hayashi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 83 days.

(21) Appl. No.: 15/615,959

(22) Filed: Jun. 7, 2017

(65) Prior Publication Data

US 2017/0356377 A1 Dec. 14, 2017

(30) Foreign Application Priority Data

Jun. 9, 2016 (JP) ................................. 2016-115451

(51) Int. Cl.
*F02D 35/02* (2006.01)
*F02D 41/14* (2006.01)
(Continued)

(52) U.S. Cl.
CPC ..... *F02D 41/1401* (2013.01); *F02D 19/0636* (2013.01); *F02D 35/023* (2013.01);
(Continued)

(58) Field of Classification Search
CPC .. F02D 35/023; F02D 35/028; F02D 41/0002; F02D 41/18; F02D 2200/0402;
(Continued)

(56) References Cited

U.S. PATENT DOCUMENTS

| 4,942,848 A | 7/1990 | Terasaka |
| 2008/0228383 A1* | 9/2008 | Nakagawa .......... F02D 41/1497 701/113 |

(Continued)

FOREIGN PATENT DOCUMENTS

| JP | S63-272935 A | 11/1988 |
| JP | S64-41644 A | 2/1989 |

(Continued)

*Primary Examiner* — Marguerite McMahon
*Assistant Examiner* — Tea Holbrook
(74) *Attorney, Agent, or Firm* — Hunton Andrews Kurth LLP

(57) ABSTRACT

A controller for an internal combustion engine is configured, when the speed of combustion of a fuel in a cylinder changes as the property of the fuel injected from a fuel injection valve changes, to change a combustion limit excess air ratio that is a target value of a fuel injection amount feedforward control according to a first relationship that the combustion limit excess air ratio increases as the speed of combustion of the fuel in the cylinder increases. The controller is also configured, when the speed of combustion of the fuel in the cylinder changes as the property of the fuel injected from the fuel injection valve changes, to change the value of a combustion limit combustion speed parameter that is the target value of a fuel injection amount feedback control according to a second relationship that the speed of combustion of the fuel in the cylinder corresponding to a combustion limit increases as the speed of combustion of the fuel in the cylinder increases.

14 Claims, 9 Drawing Sheets

(51) Int. Cl.
  *F02D 41/00* (2006.01)
  *F02D 19/06* (2006.01)
(52) U.S. Cl.
  CPC ......... *F02D 35/028* (2013.01); *F02D 41/005* (2013.01); *F02D 41/008* (2013.01); *F02D 41/0025* (2013.01); *F02D 41/0052* (2013.01); *F02D 41/1475* (2013.01); *F02D 2041/141* (2013.01); *F02D 2200/0612* (2013.01); *Y02T 10/36* (2013.01); *Y02T 10/47* (2013.01)
(58) Field of Classification Search
  CPC ............. F02D 41/1454; F02D 41/0072; F02D 41/0052; F02D 2041/389; F02D 23/00; F02D 41/40; F02D 19/061; F02D 19/081; F02D 41/2454; F02D 2200/02; F02D 2250/36; F02D 2041/141; F02D 41/1401; F02D 41/1475
  USPC .......... 123/435, 704, 434, 429; 701/101–105
  See application file for complete search history.

(56) References Cited

U.S. PATENT DOCUMENTS

| | | | | |
|---|---|---|---|---|
| 2011/0067679 | A1* | 3/2011 | Hitomi | F02D 41/3035 |
| | | | | 123/564 |
| 2012/0186225 | A1* | 7/2012 | Amann | F02D 35/028 |
| | | | | 60/274 |
| 2013/0046451 | A1* | 2/2013 | Suzuki | F02D 35/023 |
| | | | | 701/102 |
| 2016/0123247 | A1* | 5/2016 | Mizoguchi | B60W 10/06 |
| | | | | 123/406.55 |
| 2016/0290307 | A1 | 10/2016 | Urano et al. | |

FOREIGN PATENT DOCUMENTS

| | | |
|---|---|---|
| JP | 2005-146930 A | 6/2005 |
| JP | 2007-297951 A | 11/2007 |
| JP | 2015-094339 A | 5/2015 |

\* cited by examiner

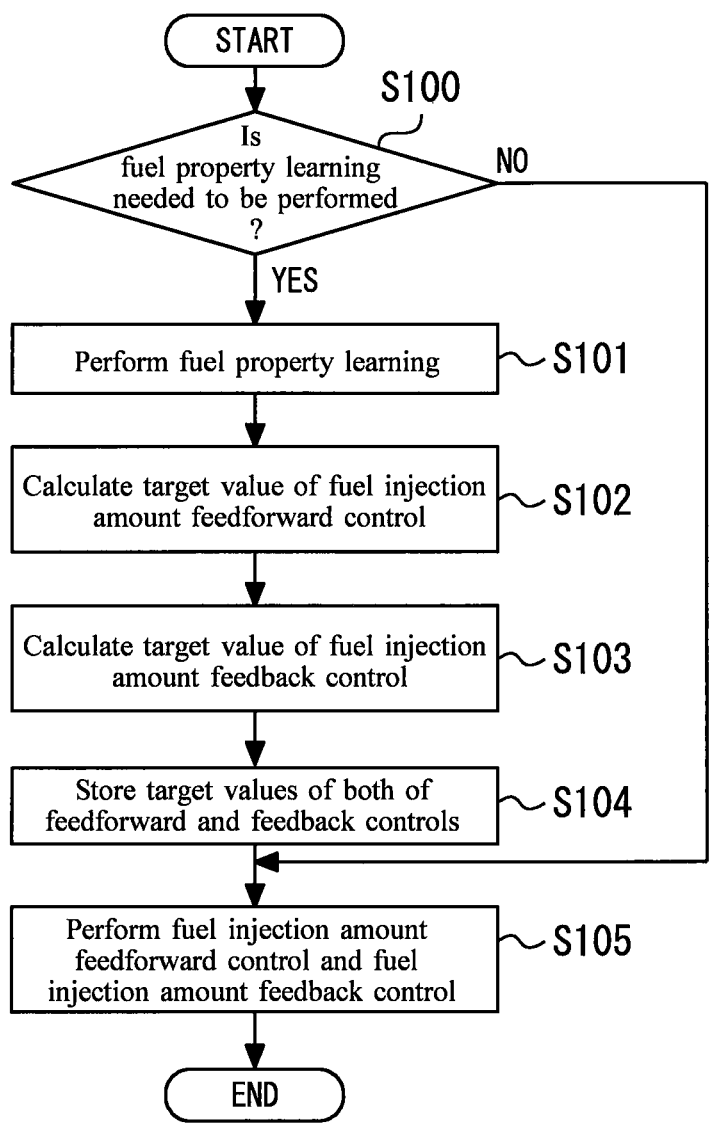

Fig. 5
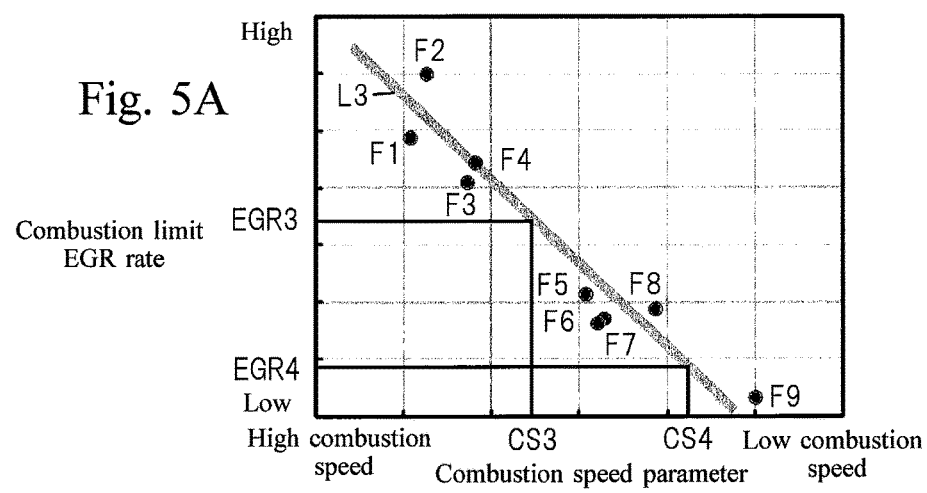
Fig. 5A
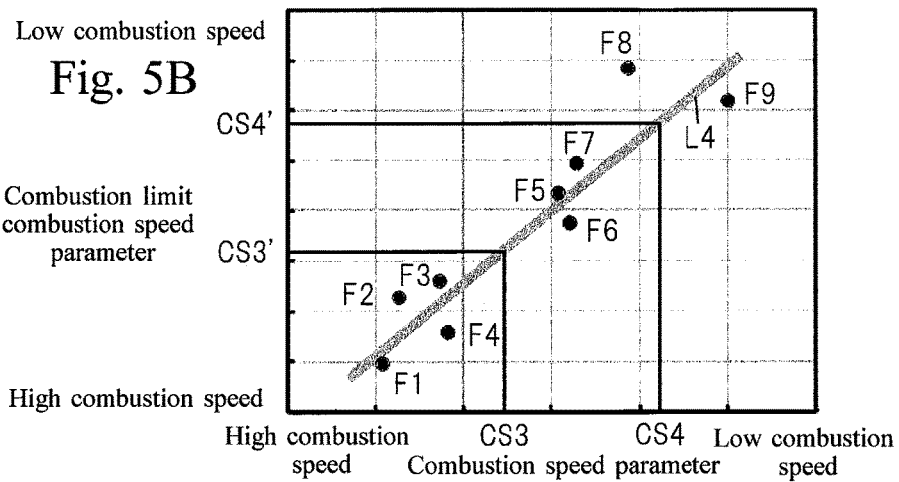
Fig. 5B

Fig. 7
Fig. 7A
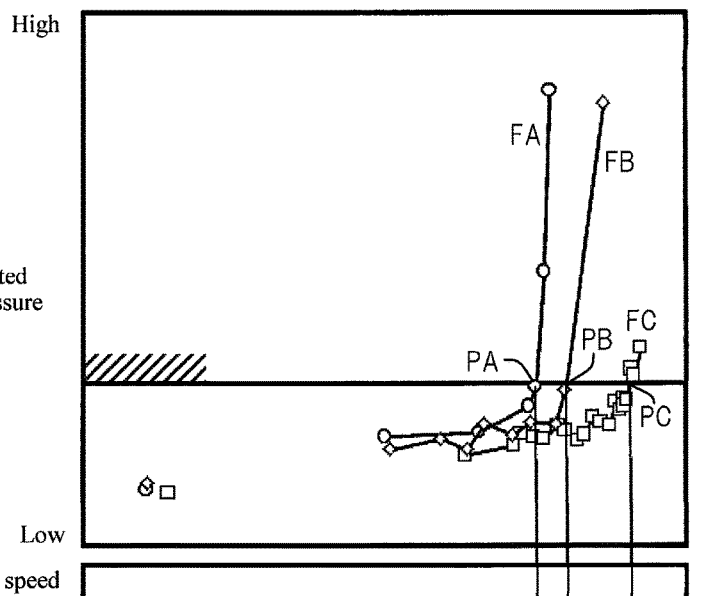
Fig. 7B
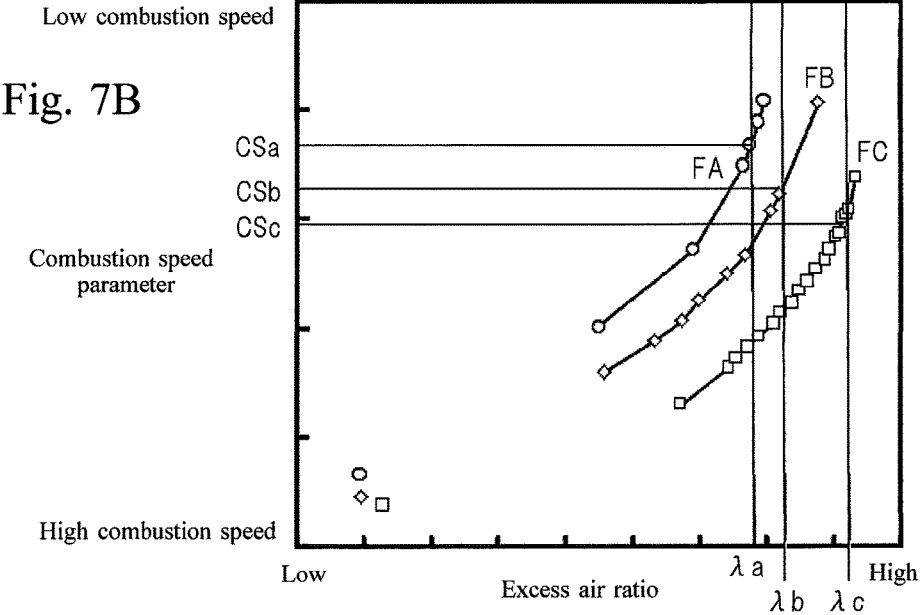

CONTROLLER FOR INTERNAL COMBUSTION ENGINE

CROSS-REFERENCE TO RELATED APPLICATION

This application is based on and claims the benefit of Japanese Patent Application No. 2016-115451, filed on Jun. 9, 2016, which is incorporated by reference herein in its entirety.

BACKGROUND

Technical Field

The present disclosure relates to a controller for an internal combustion engine that has an in-cylinder pressure sensor.

Background Art

Internal combustion engines that perform a lean burn operation are known. An example of this kind of internal combustion engines is described in JP2007-297951A.

With the internal combustion engine described in JP2007-297951A, combustion can occur even if a fuel that is obtained by steam reforming of gasoline is very lean. JP2007-297951A further describes that, depending on the condition for steam reforming, the composition ratio of hydrogen, carbon monoxide or methane resulting from the steam reforming can be very high. That is, JP2007-297951A describes that the property of the fuel obtained by steam reforming changes depending on the condition for the steam reforming.

In addition, with the internal combustion engine described in JP2007-297951A, the composition of the fuel supplied to the cylinder is predicted from the temperature of the reforming catalyst or the like. Thus, with the internal combustion engine described in JP2007-297951A, even if the property of the fuel obtained by steam reforming changes, the lean burn operation can be achieved by predicting the composition of the current fuel.

JP2007-297951A is a patent document which may be related to the present disclosure.

SUMMARY

With the internal combustion engine described in JP2007-297951A, in order to predict the composition of the fuel supplied to the cylinder, the gas concentration of one of the main components of the fuel supplied to the cylinder needs to be detected with a gas concentration sensor, and the gas concentration of the remaining components need to be calculated based on a map.

That is, if the property of the fuel injected from the fuel injection valve changes, the internal combustion engine described in JP2007-297951A may not achieve stable combustion without grasping the property of the current fuel.

In view of the problems described above, an object of the present disclosure is to provide a controller for an internal combustion engine that can achieve stable combustion without grasping the property of the fuel (more specifically, the composition of the fuel) even if the property of the fuel injected from a fuel injection valve changes.

The present disclosure provides a controller for an internal combustion engine, the internal combustion engine including:

a cylinder;
an in-cylinder pressure sensor configured to detect an in-cylinder pressure in the cylinder; and
a fuel injection valve,
the internal combustion engine being configured to perform a lean burn operation,
the controller being configured to:
calculate a combustion speed parameter that indicates a speed of combustion of a fuel in the cylinder based on the in-cylinder pressure;
perform at least one of a fuel injection amount feedforward control based on a combustion limit excess air ratio that is a target value of the fuel injection amount feedforward control, and a fuel injection amount feedback control based on a combustion limit combustion speed parameter that indicates a speed of combustion of the fuel in the cylinder corresponding to a combustion limit, the combustion limit combustion speed parameter being a target value of the fuel injection amount feedback control; and
perform, when the speed of combustion of the fuel in the cylinder changes as a property of the fuel injected from the fuel injection valve changes, at least one of a change of the combustion limit excess air ratio according to a first relationship that the combustion limit excess air ratio increases as the speed of combustion of the fuel in the cylinder increases and a change of a value of the combustion limit combustion speed parameter according to a second relationship that the speed of combustion of the fuel in the cylinder corresponding to the combustion limit increases as the speed of combustion of the fuel in the cylinder increases.

As a result of earnest study, the inventors have found that the speed of combustion of the fuel in the cylinder changes if the property of the fuel injected from the fuel injection valve changes under an operational condition where the excess air ratio is fixed at a preset value. More specifically, under an operational condition where the excess air ratio is fixed at a preset value, the value of the combustion speed parameter that indicates the speed of combustion of the fuel in the cylinder varies among fuels having different properties.

Furthermore, as a result of earnest study, the inventors have found that the value of the combustion limit excess air ratio to be used as the target value of the fuel injection amount feedforward control varies among the fuels having different properties. Also, the inventors have found that the value of the combustion limit combustion speed parameter that indicates the speed of combustion of the fuel in the cylinder corresponding to the combustion limit (more specifically, the combustion limit due to the excess air ratio being high) to be used as the target value of the fuel injection amount feedback control varies among the fuels having different properties.

More specifically, as a result of earnest study, the inventors have found that, when the property of the fuel injected from the fuel injection valve changes, the value of the combustion limit excess air ratio increases as the speed of combustion of the fuel in the cylinder increases. Also, the inventors have found that, when the property of the fuel injected from the fuel injection valve changes, the speed of combustion of the fuel in the cylinder at the time when the combustion limit is reached (more specifically, at the time when the excess air ratio is increased until the combustion limit is reached) increases as the speed of combustion of the fuel in the cylinder increases at the time when the combustion limit is not reached.

That is, as a result of earnest study, the inventors have found that, when the property of the fuel injected from the fuel injection valve changes, if the speed of combustion of the fuel in the cylinder increases, the combustion does not deteriorate even if the combustion limit excess air ratio is set at a large value, and rather the emission deteriorates unless the combustion limit excess air ratio is set at a large value. Also, the inventors have found that, when the property of the fuel injected from the fuel injection valve changes, if the speed of combustion of the fuel in the cylinder at the time when the combustion limit is not reached increases, the combustion does not deteriorate even if the speed of combustion of the fuel in the cylinder corresponding to the combustion limit (more specifically, the combustion limit due to the excess air ratio being high) that corresponds to the target value of the fuel injection amount feedback control is set at a large value, and rather the emission deteriorates unless the speed of combustion of the fuel in the cylinder corresponding to the combustion limit that corresponds to the target value of the fuel injection amount feedback control is set at a large value.

In addition, as a result of earnest study, the inventors have found that, when the property of the fuel injected from the fuel injection valve changes, if the speed of combustion of the fuel in the cylinder decreases, the combustion deteriorates and a torque variation occurs unless the combustion limit excess air ratio is set at a small value. Also, the inventors have found that, when the property of the fuel injected from the fuel injection valve changes, if the speed of combustion of the fuel in the cylinder at the time when the combustion limit is not reached decreases, the combustion deteriorates and a torque variation occurs unless the speed of combustion of the fuel in the cylinder corresponding to the combustion limit that corresponds to the target value of the fuel injection amount feedback control is set at a small value.

In view of this, when the speed of combustion of the fuel in the cylinder changes as the property of the fuel injected from the fuel injection valve changes, the controller for an internal combustion engine according to the present disclosure performs at least one of a change of the combustion limit excess air ratio according to the first relationship that the combustion limit excess air ratio increases as the speed of combustion of the fuel in the cylinder increases and a change of the value of the combustion limit combustion speed parameter according to the second relationship that the speed of combustion of the fuel in the cylinder corresponding to the combustion limit (more specifically, the combustion limit due to the excess air ratio being high) increases as the speed of combustion of the fuel in the cylinder increases.

Thus, the controller for an internal combustion engine according to the present disclosure can reduce the possibility that the emission in the lean burn operation deteriorates when the speed of combustion of the fuel in the cylinder increases as the property of the fuel injected from the fuel injection valve changes or the possibility that a torque variation occurs during the lean burn operation when the speed of combustion of the fuel in the cylinder decreases as the property of the fuel injected from the fuel injection valve changes.

That is, with the controller for an internal combustion engine according to the present disclosure, even when the property of the fuel injected from the fuel injection valve changes, stable combustion can be achieved in the lean burn operation without grasping the property of the fuel.

That is, with the controller for an internal combustion engine according to the present disclosure, unlike the example of the internal combustion engine described in JP2007-297951A, when the property of the fuel injected from the fuel injection valve changes, there is no need to grasp the property of the fuel, and stable combustion of the current fuel can be achieved by grasping the change of the fuel combustion speed due to the change of the property of the fuel.

In the controller for an internal combustion engine according to the present disclosure, when the fuel injection amount feedback control is being performed with the target value of the fuel injection amount feedback control being set at a value of an excess air ratio that is leaner than a theoretical air-fuel ratio, the controller may calculate the combustion speed parameter that indicates the speed of combustion of the fuel in the cylinder based on the in-cylinder pressure.

That is, with the controller for an internal combustion engine according to the present disclosure, when the fuel injection amount feedback control is being performed to calculate the combustion speed parameter that indicates the speed of combustion of the fuel in the cylinder based on the in-cylinder pressure, the target value of the fuel injection amount feedback control is set at a value of the excess air ratio that is leaner than the theoretical air-fuel ratio.

Thus, the controller for an internal combustion engine according to the present disclosure can calculate the combustion speed parameter that more clearly reflects the differences in property between the fuels than in the example where the target value of the fuel injection amount feedback control is set at the theoretical air-fuel ratio when the combustion speed parameter that indicates the speed of combustion of the fuel in the cylinder is calculated based on the in-cylinder pressure.

That is, with the controller for an internal combustion engine according to the present disclosure, compared with the example where the target value of the fuel injection amount feedback control is set at the theoretical air-fuel ratio when the combustion speed parameter that indicates the speed of combustion of the fuel in the cylinder is calculated based on the in-cylinder pressure, for example, the difference between the combustion speed parameter of a first fuel and the combustion speed parameter of a second fuel having a different property than the first fuel can be increased, so that the resolution for discriminating the first and second fuels having different properties can be improved.

In the controller for an internal combustion engine according to the present disclosure, the target value of the fuel injection amount feedback control may be set at a value of the excess air ratio that is richer than the combustion limit excess air ratio.

Thus, the controller for an internal combustion engine according to the present disclosure can reduce the possibility that unstable combustion occurs compared with the example where the target value of the fuel injection amount feedback control is set at the combustion limit excess air ratio when the combustion speed parameter that indicates the speed of combustion of the fuel in the cylinder is calculated based on the in-cylinder pressure.

That is, the controller for an internal combustion engine according to the present disclosure can reduce the possibility that unstable combustion occurs when the fuel injection amount feedback control is being performed to calculate the combustion speed parameter of a fuel having a low combustion speed.

In the controller for an internal combustion engine according to the present disclosure, each time refueling is performed, the controller may calculate the combustion speed parameter based on the in-cylinder pressure, and may calculate the combustion limit excess air ratio according to the first relationship or calculate the combustion limit combustion speed parameter according to the second relationship.

That is, with the controller for an internal combustion engine according to the present disclosure, each time refueling, which is likely to cause a change of the property of the fuel injected from the fuel injection valve, is performed, the combustion speed parameter is calculated. Furthermore, each time refueling, which is likely to cause a change of the property of the fuel injected from the fuel injection valve, is performed, the combustion limit excess air ratio is calculated from the combustion speed parameter according to the first relationship or the combustion limit combustion speed parameter is calculated from the combustion speed parameter according to the second relationship. If the speed of combustion of the fuel in the cylinder changes as a result of the refueling, the combustion limit excess air ratio or the value of the combustion limit combustion speed parameter is changed.

Thus, with the controller for an internal combustion engine according to the present disclosure, more stable combustion can be achieved in the lean burn operation than in the example where the combustion limit excess air ratio or the value of the combustion limit combustion speed parameter is not changed even if the speed of combustion of the fuel in the cylinder changes as a result of the refueling.

In the controller for an internal combustion engine according to the present disclosure, each time a preset period in which there is a possibility that the property of the fuel injected from the fuel injection valve changes has elapsed since the last stop of the internal combustion engine, the controller may calculate the combustion speed parameter based on the in-cylinder pressure, and may calculate the combustion limit excess air ratio according to the first relationship or calculate the combustion limit combustion speed parameter according to the second relationship.

That is, with the controller for an internal combustion engine according to the present disclosure, each time a preset period has elapsed since the last stop of the internal combustion engine, and the property of the fuel injected from the fuel injection valve becomes likely to change, the combustion speed parameter is calculated. Furthermore, each time a preset period has elapsed since the last stop of the internal combustion engine, and the property of the fuel injected from the fuel injection valve becomes likely to change, the combustion limit excess air ratio is calculated from the combustion speed parameter according to the first relationship or the combustion limit combustion speed parameter is calculated from the combustion speed parameter according to the second relationship. If the speed of combustion of the fuel in the cylinder changes as a result of the preset period having elapsed since the last stop of the internal combustion engine, the combustion limit excess air ratio or the value of the combustion limit combustion speed parameter is changed.

Thus, with the controller for an internal combustion engine according to the present disclosure, more stable combustion can be achieved in the lean burn operation than in the example where the combustion limit excess air ratio or the value of the combustion limit combustion speed parameter is not changed even if the speed of combustion of the fuel in the cylinder changes as a result of the preset period having elapsed since the last stop of the internal combustion engine.

Furthermore, the present disclosure provides a controller for an internal combustion engine, the internal combustion engine including:
a cylinder;
an intake channel connected to the cylinder;
an exhaust channel connected to the cylinder;
an EGR channel connecting the intake channel and the exhaust channel to each other;
an EGR valve disposed in the EGR channel;
an in-cylinder pressure sensor configured to detect an in-cylinder pressure in the cylinder; and
a fuel injection valve, and
the internal combustion engine being configured to perform an EGR operation,
the controller being configured to:
calculate a combustion speed parameter that indicates a speed of combustion of a fuel in the cylinder based on the in-cylinder pressure;
perform at least one of an EGR rate feedforward control based on a combustion limit EGR rate that is a target value of the EGR rate feedforward control and is greater than zero, and an EGR rate feedback control based on a combustion limit combustion speed parameter that indicates a speed of combustion of the fuel in the cylinder corresponding to a combustion limit and that corresponds to an EGR rate greater than zero, the combustion limit combustion speed parameter being a target value of the EGR rate feedback control; and
perform, when the speed of combustion of the fuel in the cylinder changes as a property of the fuel injected from the fuel injection valve changes, at least one of a change of the combustion limit EGR rate according to a third relationship that the combustion limit EGR rate increases as the speed of combustion of the fuel in the cylinder increases and a change of a value of the combustion limit combustion speed parameter according to a fourth relationship that the speed of combustion of the fuel in the cylinder corresponding to the combustion limit increases as the speed of combustion of the fuel in the cylinder increases.

As a result of earnest study, the inventors have found that the speed of combustion of the fuel in the cylinder changes if the property of the fuel injected from the fuel injection valve changes under an operational condition where the EGR rate is fixed at a preset value. More specifically, under an operational condition where the EGR rate is fixed at a preset value, the value of the combustion speed parameter that indicates the speed of combustion of the fuel in the cylinder varies among fuels having different properties.

Furthermore, as a result of earnest study, the inventors have found that the value of the combustion limit EGR rate to be used as the target value of the EGR rate feedforward control varies among the fuels having different properties. Also, the inventors have found that the value of the combustion limit combustion speed parameter that indicates the speed of combustion of the fuel in the cylinder corresponding to the combustion limit (more specifically, the combustion limit due to the EGR rate being high) to be used as the target value of the EGR rate feedback control varies among the fuels having different properties.

More specifically, as a result of earnest study, the inventors have found that, when the property of the fuel injected from the fuel injection valve changes, the value of the combustion limit EGR rate increases as the speed of combustion of the fuel in the cylinder increases. Also, the inventors have found that, when the property of the fuel injected from the fuel injection valve changes, the speed of combustion of the fuel in the cylinder at the time when the combustion limit is reached (more specifically, at the time when the EGR rate is increased until the combustion limit is reached) increases as the speed of combustion of the fuel in the cylinder increases at the time when the combustion limit is not reached.

That is, as a result of earnest study, the inventors have found that, when the property of the fuel injected from the fuel injection valve changes, if the speed of combustion of the fuel in the cylinder increases, the combustion does not deteriorate even if the combustion limit EGR rate is set at a large value, and rather the emission deteriorates unless the combustion limit EGR rate is set at a large value. Also, the inventors have found that, when the property of the fuel injected from the fuel injection valve changes, if the speed of combustion of the fuel in the cylinder at the time when the combustion limit is not reached increases, the combustion does not deteriorate even if the speed of combustion of the fuel in the cylinder corresponding to the combustion limit (more specifically, the combustion limit due to the EGR rate being high) that corresponds to the target value of the EGR rate feedback control is set at a large value, and rather the emission deteriorates unless the speed of combustion of the fuel in the cylinder corresponding to the combustion limit that corresponds to the target value of the EGR rate feedback control is set at a large value.

In addition, as a result of earnest study, the inventors have found that, when the property of the fuel injected from the fuel injection valve changes, if the speed of combustion of the fuel in the cylinder decreases, the combustion deteriorates unless the combustion limit EGR rate is set at a small value. Also, the inventors have found that, when the property of the fuel injected from the fuel injection valve changes, if the speed of combustion of the fuel in the cylinder at the time when the combustion limit is not reached decreases, the combustion deteriorates unless the speed of combustion of the fuel in the cylinder corresponding to the combustion limit that corresponds to the target value of the EGR rate feedback control is set at a small value.

In view of this, when the speed of combustion of the fuel in the cylinder changes as the property of the fuel injected from the fuel injection valve changes, the controller for an internal combustion engine according to the present disclosure performs at least one of a change of the combustion limit EGR rate that is the target value of the EGR rate feedforward control and is greater than zero according to a third relationship that the combustion limit EGR rate increases as the speed of combustion of the fuel in the cylinder increases and a change of the value of the combustion limit combustion speed parameter (more specifically, the combustion limit combustion speed parameter corresponding to an EGR rate greater than zero) that indicates the speed of combustion of the fuel in the cylinder corresponding to the combustion limit that is the target value of the EGR rate feedback control according to the fourth relationship that the speed of combustion of the fuel in the cylinder corresponding to the combustion limit (more specifically, the combustion limit due to the EGR rate being high) increases as the speed of combustion of the fuel in the cylinder increases.

Thus, the controller for an internal combustion engine according to the present disclosure can reduce the possibility that the emission in the EGR operation deteriorates when the speed of combustion of the fuel in the cylinder increases as the property of the fuel injected from the fuel injection valve changes or the possibility that the combustion deteriorates during the EGR operation when the speed of combustion of the fuel in the cylinder decreases as the property of the fuel injected from the fuel injection valve changes.

That is, with the controller for an internal combustion engine according to the present disclosure, even when the property of the fuel injected from the fuel injection valve changes, stable combustion can be achieved in the EGR operation without grasping the property of the fuel.

That is, with the controller for an internal combustion engine according to the present disclosure, unlike the example of the internal combustion engine described in JP2007-297951A, when the property of the fuel injected from the fuel injection valve changes, there is no need to grasp the property of the fuel, and stable combustion of the current fuel can be achieved by grasping the change of the fuel combustion speed due to the change of the property of the fuel.

In the controller for an internal combustion engine according to the present disclosure, when the EGR rate feedback control is being performed with the target value of the EGR rate feedback control being set at a value of an EGR rate that is greater than zero, the controller may calculate the combustion speed parameter that indicates the speed of combustion of the fuel in the cylinder based on the in-cylinder pressure.

That is, with the controller for an internal combustion engine according to the present disclosure, when the EGR rate feedback control is being performed to calculate the combustion speed parameter that indicates the speed of combustion of the fuel in the cylinder based on the in-cylinder pressure, the target value of the EGR rate feedback control is set at a value of the EGR rate that is greater than zero.

Thus, the controller for an internal combustion engine according to the present disclosure can calculate the combustion speed parameter that more clearly reflects the differences in property between the fuels than in the example where the target value of the EGR rate feedback control is set at an EGR rate of 0 when the combustion speed parameter that indicates the speed of combustion of the fuel in the cylinder is calculated based on the in-cylinder pressure.

That is, with the controller for an internal combustion engine according to the present disclosure, compared with the example where the target value of the EGR rate feedback control is set at an EGR rate of 0 when the combustion speed parameter that indicates the speed of combustion of the fuel in the cylinder is calculated based on the in-cylinder pressure, for example, the difference between the combustion speed parameter of a first fuel and the combustion speed parameter of a second fuel having a different property than the first fuel can be increased, so that the resolution for discriminating the first and second fuels having different properties can be improved.

In the controller for an internal combustion engine according to the present disclosure, the target value of the EGR rate feedback control may be set at a value of the EGR rate that is smaller than the combustion limit EGR rate.

Thus, the controller for an internal combustion engine according to the present disclosure can reduce the possibility that unstable combustion occurs compared with the example where the target value of the EGR rate feedback control is set at the combustion limit EGR rate when the combustion speed parameter that indicates the speed of combustion of the fuel in the cylinder is calculated based on the in-cylinder pressure.

That is, the controller for an internal combustion engine according to the present disclosure can reduce the possibility that unstable combustion occurs when the EGR rate feedback control is being performed to calculate the combustion speed parameter of a fuel having a low combustion speed.

In the controller for an internal combustion engine according to the present disclosure, each time refueling is performed, the controller may calculate the combustion speed parameter based on the in-cylinder pressure, and may calculate the combustion limit EGR rate according to the third relationship or calculate the combustion limit combustion speed parameter according to the fourth relationship.

That is, with the controller for an internal combustion engine according to the present disclosure, each time refueling, which is likely to cause a change of the property of the fuel injected from the fuel injection valve, is performed, the combustion speed parameter is calculated. Furthermore, each time refueling, which is likely to cause a change of the property of the fuel injected from the fuel injection valve, is performed, the combustion limit EGR rate is calculated from the combustion speed parameter according to the third relationship or the combustion limit combustion speed parameter is calculated from the combustion speed parameter according to the fourth relationship. If the speed of combustion of the fuel in the cylinder changes as a result of the refueling, the combustion limit EGR rate or the value of the combustion limit combustion speed parameter is changed.

Thus, with the controller for an internal combustion engine according to the present disclosure, more stable combustion can be achieved in the EGR operation than in the example where the combustion limit EGR rate or the value of the combustion limit combustion speed parameter is not changed even if the speed of combustion of the fuel in the cylinder changes as a result of the refueling.

In the controller for an internal combustion engine according to the present disclosure, each time a preset period in which there is a possibility that the property of the fuel injected from the fuel injection valve changes has elapsed since the last stop of the internal combustion engine, the controller may calculate the combustion speed parameter based on the in-cylinder pressure, and may calculate the combustion limit EGR rate according to the third relationship or calculate the combustion limit combustion speed parameter according to the fourth relationship.

That is, with the controller for an internal combustion engine according to the present disclosure, each time a preset period has elapsed since the last stop of the internal combustion engine, and the property of the fuel injected from the fuel injection valve becomes likely to change, the combustion speed parameter is calculated. Furthermore, each time a preset period has elapsed since the last stop of the internal combustion engine, and the property of the fuel injected from the fuel injection valve becomes likely to change, the combustion limit EGR rate is calculated from the combustion speed parameter according to the third relationship or the combustion limit combustion speed parameter is calculated from the combustion speed parameter according to the fourth relationship. If the speed of combustion of the fuel in the cylinder changes as a result of the preset period having elapsed since the last stop of the internal combustion engine, the combustion limit EGR rate or the value of the combustion limit combustion speed parameter is changed.

Thus, with the controller for an internal combustion engine according to the present disclosure, more stable combustion can be achieved in the EGR operation than in the example where the combustion limit EGR rate or the value of the combustion limit combustion speed parameter is not changed even if the speed of combustion of the fuel in the cylinder changes as a result of the preset period having elapsed since the last stop of the internal combustion engine.

According to the present disclosure, even if the property of the fuel injected from the fuel injection valve changes, stable combustion can be achieved without grasping the property of the fuel.

BRIEF DESCRIPTION OF THE DRAWINGS

FIG. 4 is a flowchart for illustrating a fuel injection amount control performed by the controller for an internal combustion engine according to the first embodiment to achieve a lean burn operation;

FIGS. 5A and 5B are graphs showing relationships involving the combustion speed parameter that indicates the speed of combustion of fuels F1, F2, . . . , F8 and F9 having different properties in the cylinder 14';

FIGS. 7A and 7B are graphs for illustrating a phenomenon observed in an earnest study by the inventors;

DETAILED DESCRIPTION

Figure 1:
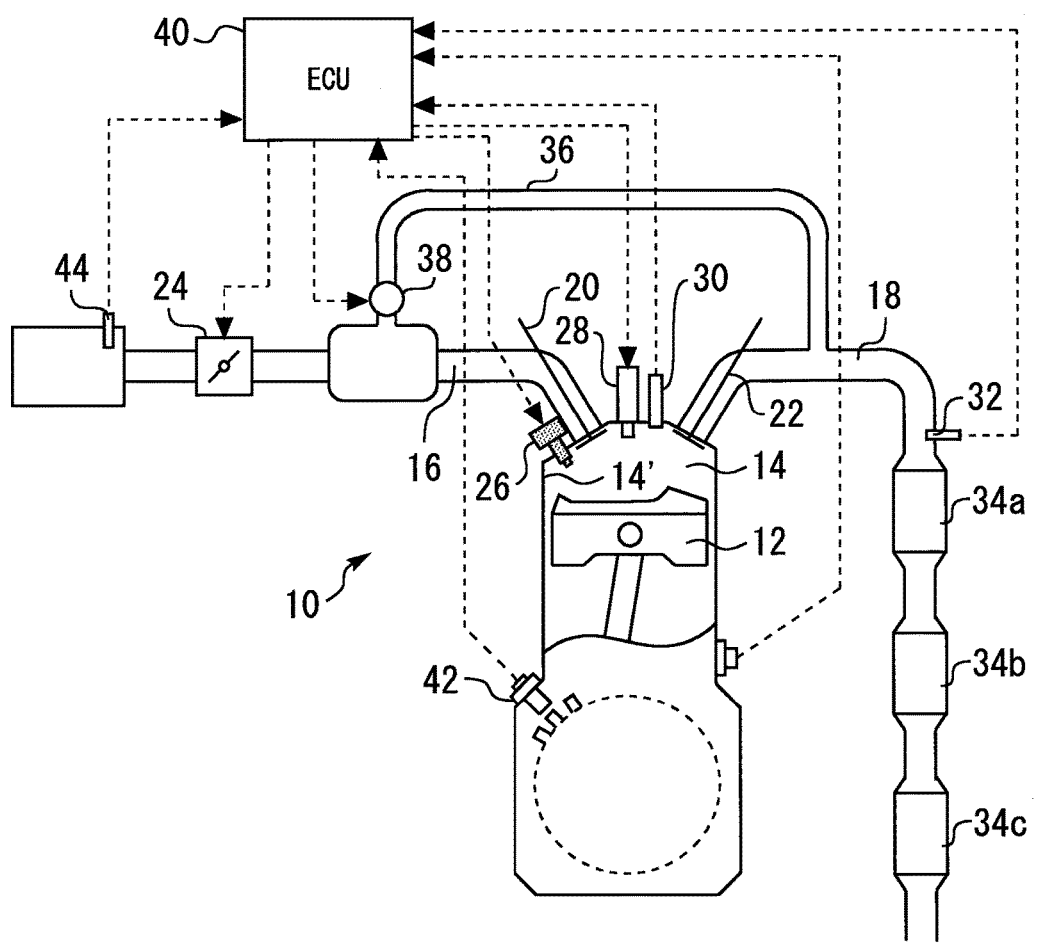
FIG. 1 is a schematic diagram showing a configuration of an engine system that incorporates a controller for an internal combustion engine according to a first embodiment.
Figure 2:
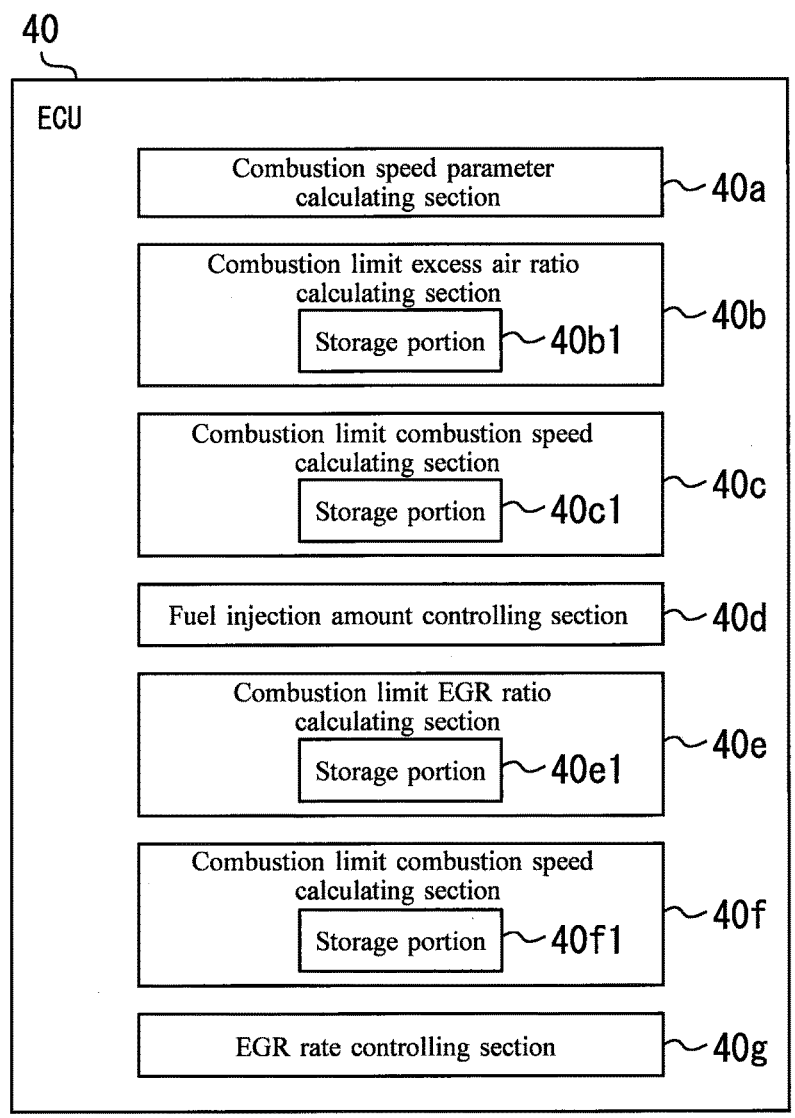
FIG. 2 is a functional block diagram showing an ECU 40 shown in FIG. 1.

In the following, a controller for an internal combustion engine according to a first embodiment of the present disclosure will be described. FIG. 1 is a schematic diagram showing a configuration of an engine system that incorporates the controller for an internal combustion engine according to the first embodiment. FIG. 2 is a functional block diagram concerning an ECU 40 shown in FIG. 1.

In the example shown in FIG. 1, the engine system that incorporates the controller for an internal combustion engine according to the first embodiment includes an internal combustion engine 10. A piston 12 is disposed in a cylinder 14' of the internal combustion engine 10. A combustion chamber 14 is formed in the cylinder 14' at the top side of the piston 12. The combustion chamber 14 is in communication with an intake channel 16 and an exhaust channel 18.

An intake port, which forms a part of the intake channel 16, is provided with an intake valve 20 that opens and closes the intake port. That is, the cylinder 14' and the intake channel 16 are connected to each other via the intake valve 20. An exhaust port, which forms a part of the exhaust channel 18, is provided with an exhaust valve 22 that opens and closes the exhaust port. That is, the cylinder 14' and the exhaust channel 18 are connected to each other via the exhaust valve 22. The intake channel 16 is provided with a throttle valve 24. In the exhaust channel 18, an excess air ratio sensor 32, a three-way catalyst 34a, an NOx storage/reduction catalyst 34b, and an NOx selective reduction catalyst 34c are disposed, for example. An EGR channel 36 that connects the intake channel 16 and the exhaust channel 18 to each other is also provided. The EGR channel 36 is provided with an EGR valve 38.

Although FIG. 1 shows only one cylinder 14', other cylinders (not shown) than the cylinder 14' are also provided in the example shown in FIG. 1.

In the example shown in FIG. 1, the controller for an internal combustion engine according to the first embodiment is used with the internal combustion engine 10 that has a plurality of cylinders. In another example, however, the controller for an internal combustion engine according to the first embodiment can also be applied to an internal combustion engine that has only one cylinder.

In the example shown in FIG. 1 in which the controller for an internal combustion engine according to the first embodiment is used, the excess air ratio sensor 32 detects an excess air ratio. However, in another example in which the controller for an internal combustion engine according to the first embodiment is used, the excess air ratio sensor 32 may be omitted, and the excess air ratio may be calculated from a fuel injection amount and an intake air amount detected by an air flow sensor 44 described later as described in the paragraph 0014 of Japanese Patent No. 3767063, for example.

In the example of the engine system incorporating the controller for an internal combustion engine according to the first embodiment shown in FIG. 1, each cylinder of the internal combustion engine 10 is provided with a fuel injection valve 26 that directly injects a fuel into the combustion chamber 14 (cylinder 14') and a spark plug 28 that ignites an air-fuel mixture. Furthermore, each cylinder incorporates an in-cylinder pressure sensor 30 that detects an in-cylinder pressure P, which is a combustion pressure in the cylinder.

In the example shown in FIG. 1 in which the controller for an internal combustion engine according to the first embodiment is used, the in-cylinder pressure sensor 30 is provided for each of the plurality of cylinders. However, in another example in which the controller for an internal combustion engine according to the first embodiment is used, some of the cylinders may be provided with the in-cylinder pressure sensor 30, the others may not be provided with the in-cylinder pressure sensor 30, and the in-cylinder pressure P of the cylinders that are not provided with the in-cylinder, pressure sensor 30 may be estimated from the in-cylinder pressures P detected by the in-cylinder pressure sensors 30 of the cylinders provided with the in-cylinder pressure sensor 30.

In the example shown in FIG. 1, the controller for an internal combustion engine according to the first embodiment is used with the internal combustion engine 10 in which the fuel injection valve 26 directly injects the fuel into the cylinder 14'. In another example, however, the controller for an internal combustion engine according to the first embodiment may be used with an internal combustion engine in which the fuel injection valve injects the fuel into the intake port.

In the example shown in FIG. 1, the controller for an internal combustion engine according to the first embodiment is used with the internal combustion engine 10 provided with the spark plug 28. In another example, however, the controller for an internal combustion engine according to the first embodiment may be used with an internal combustion engine that is not provided with the spark plug 28.

In the example shown in FIG. 1 in which the controller for an internal combustion engine according to the first embodiment is used, the engine system does not include a turbocharger (not shown). However, in another example in which the controller for an internal combustion engine according to the first embodiment is used, the engine system may include a turbocharger. In an example of the engine system provided with a turbocharger, a compressor (not shown) of the turbocharger is disposed on a part of the intake channel 16 upstream of the throttle valve 24, and a turbine (not shown) of the turbocharger is disposed on the exhaust channel 18.

More specifically, in an example of an engine system provided with a turbocharger and incorporating the controller for an internal combustion engine according to the first embodiment, the EGR channel 36 connects a part of the intake channel 16 upstream of the compressor and a part of the exhaust channel 18 downstream of the turbine to each other, thereby forming a low-pressure EGR apparatus.

In another example of the engine system provided with a turbocharger and incorporating the controller for an internal combustion engine according to the first embodiment, the EGR channel 36 connects a part of the intake channel 16 downstream of the throttle valve 24, for example, and a part of the exhaust channel 18 upstream of the turbine to each other, thereby forming a high-pressure EGR apparatus.

The controller for an internal combustion engine according to the first embodiment can be used with any of the engine system having the low-pressure EGR apparatus, the engine system having the high-pressure EGR apparatus, and an engine system having both the low-pressure EGR apparatus and the high-pressure EGR apparatus.

The engine system shown in FIG. 1 that incorporates the controller for an internal combustion engine according to the first embodiment further includes an electronic control unit (ECU) 40 that serves as the controller. An input part of the ECU 40 is connected not only to the in-cylinder pressure sensor 30 described above but also to various other sensors for grasping the operational state of the internal combustion engine 10, such as a crank angle sensor 42 that is used to grasp an engine speed and an air flow sensor 44 that detects the intake air amount. An output part of the ECU 40 is connected to various actuators for controlling the operation of the internal combustion engine 10, such as the throttle valve 24, the fuel injection valve 26, the spark plug 28 and the EGR valve 38 described above. Based on outputs of the sensors and preset programs, the ECU 40 drives the various actuators to perform engine controls including a fuel injection amount control and an EGR valve control. The ECU 40 also has a function of obtaining an output signal of the in-cylinder pressure sensor 30 and A/D-converting the output signal in synchronization with the crank angle. Thus, the ECU 40 can detect the in-cylinder pressure P at an arbitrary crank angle timing within a range allowed by the resolution of the A/D conversion.

With the engine system shown in FIG. 1 that includes the in-cylinder pressure sensor 30 and the crank angle sensor 42, in-cylinder pressure data (an in-cylinder pressure waveform) that is associated with crank angle can be obtained in each cycle of the internal combustion engine 10. A mass fraction of burned fuel MFB can be calculated from the in-cylinder pressure waveform subjected to absolute pressure correction in a well-known manner.

More specifically, using the in-cylinder pressure data, a heat release amount Q in the cylinder 14' that is associated with an arbitrary crank angle θ can be calculated according to the following formula 1, for example. Using the data on the calculated heat release amount Q in the cylinder 14', the mass fraction of burned fuel MFB (%) that is associated with the arbitrary crank angle θ can be calculated according to the following formula 2, for example. Thus, according to the formula 2, the crank angle (CAβ) at which the mass fraction of burned fuel MFB reaches a preset value β (%) can be determined.

$$Q = \int PdV + \frac{1}{\kappa - 1}(PV - P_0V_0) \quad (1)$$

$$MFB = \frac{Q(\theta) - Q(\theta_{sta})}{Q(\theta_{fin}) - Q(\theta_{sta})} \quad (2)$$

In the formula 1 described above, P denotes the in-cylinder pressure, V denotes the in-cylinder volume, and κ denotes the ratio of specific heats of an in-cylinder gas. Po and Vo denote the in-cylinder pressure and the in-cylinder volume at a calculation start point θo (a crank angle θ previously set in the compression stroke (after closing of the intake valve 20) that is determined to have an allowance with respect to assumed combustion start points), respectively. In the formula 2 described above, $\theta_{sta}$ denotes a combustion start point (CA0), and $\theta_{fin}$ denotes a combustion end point (CA100).

That is, in the example shown in FIG. 1 in which the controller for an internal combustion engine according to the first embodiment is used, the ECU 40 calculates the heat release amount Q based on the in-cylinder pressure P detected by the in-cylinder pressure sensor 30 and the in-cylinder volume V according to the formula 1, for example. The ECU 40 can calculate the mass fraction of burned fuel MFB based on the heat release amount Q according to the formula 2, for example. Furthermore, the ECU 40 can calculate a heat release rate (dQ/dθ), which is the heat release amount Q per unit crank angle, according to the following formula 3.

$$\frac{dQ}{d\theta} = \frac{1}{\kappa - 1}V\frac{dP}{d\theta} + \frac{\kappa}{\kappa - 1}P\frac{dV}{d\theta} \quad (3)$$

Next, a representative crank angle will be described. Combustion in the cylinder 14' starts with an ignition lag after the ignition timing when the air-fuel mixture is ignited. The combustion start point, that is, the point that indicates a rise of the mass fraction of burned fuel MFB corresponds to a crank angle CA0. A crank angle interval (CA0-CA10) from the crank angle CA0 to a crank angle CA10 at which the mass fraction of burned fuel MFB reaches 10% corresponds to an initial combustion period, and a crank angle interval (CA10-CA90) from the crank angle CA10 to a crank angle CA90 at which the mass fraction of burned fuel MFB reaches 90% corresponds to a main combustion period. A crank angle CA50 at which the mass fraction of burned fuel MFB reaches 50% corresponds to a combustion center.

To reduce the fuel consumption of the internal combustion engine, a lean burn operation is effective in which a target excess air ratio is set to be an excess air ratio (at which the excess air ratio is greater than 1) that is leaner than a theoretical air-fuel ratio (at which the excess air ratio is 1). The leaner the air-fuel ratio is (in other words, the higher the excess air ratio is), the fuel consumption improves, and the amount of NOx emission decreases. However, if the air-fuel ratio is excessively lean (that is, if the excess air ratio is excessively high), the combustion deteriorates, and the fuel consumption also deteriorates. On the other hand, the torque variation gradually increases as the air-fuel ratio becomes leaner (that is, as the excess air ratio increases), and abruptly increases when the air-fuel ratio becomes leaner beyond a certain value (that is, when the excess air ratio becomes higher than a value that corresponds to the certain value).

To reduce the fuel consumption and the NOx emission, it is favorable to monitor the state of the internal combustion engine 10 and to control the air-fuel ratio to be as lean as possible (that is, to control the excess air ratio to be as high as possible) without causing deterioration of the drivability.

In view of the above, in the example shown in FIG. 1 in which the controller for an internal combustion engine according to the first embodiment is used, the lean burn operation is performed.

More specifically, in the example shown in FIG. 1 in which the controller for an internal combustion engine according to the first embodiment is used, to perform the lean burn operation, the in-cylinder pressure sensor 30 detects the in-cylinder pressure P, and the ECU 40 calculates the heat release amount Q from the in-cylinder pressure P according to the formula 1, for example. The ECU 40 also calculates the mass fraction of burned fuel MFB from the heat release amount Q according to the formula 2, for example.

Furthermore, in the example shown in FIGS. 1 and 2 in which the controller for an internal combustion engine according to the first embodiment is used, to perform the lean burn operation, a combustion speed parameter calculating section 40a of the ECU 40 calculates a crank angle interval (SA-CA10), which is a period in which the crank angle changes from a crank angle SA that corresponds to the ignition timing to the crank angle CA10 at which the mass fraction of burned fuel MFB reaches 10%, for example.

That is, in the example shown in FIGS. 1 and 2 in which the controller for an internal combustion engine according to the first embodiment is used, to perform the lean burn operation, the crank angle interval (SA-CA10) is used as a combustion speed parameter that indicates the speed of combustion of the fuel in the cylinder 14'. Furthermore, the combustion speed parameter calculating section 40a calculates the crank angle interval (SA-CA10) based on the in-cylinder pressure P.

More specifically, in the example shown in FIGS. 1 and 2 in which the controller for an internal combustion engine according to the first embodiment is used, when the speed of combustion of the fuel injected from the fuel injection valve 26 is high, the value of the crank angle interval (SA-CA10) as the combustion speed parameter calculated by the combustion speed parameter calculating section 40a is small. That is, the required time for combustion is short. On the other hand, when the speed of combustion of the fuel injected from the fuel injection valve 26 is low, the value of the crank angle interval (SA-CA10) as the combustion speed parameter calculated by the combustion speed parameter calculating section 40a is large. That is, the required time for combustion is long.

In the example shown in FIGS. 1 and 2 in which the controller for an internal combustion engine according to the first embodiment is used, to perform the lean burn operation, the crank angle interval (SA-CA10) is calculated based on the in-cylinder pressure P by the combustion speed parameter calculating section 40a and used as a combustion speed parameter that indicates the speed of combustion of the fuel in the cylinder 14'. However, in another example in which the controller for an internal combustion engine according to the first embodiment is used, to perform the lean burn operation, a crank angle interval (SA-CAα) can also be used as the combustion speed parameter that indicates the speed of combustion of the fuel in the cylinder 14' (α denotes an arbitrary value from 0 to 100 excluding 10).

Alternatively, in another example in which the controller for an internal combustion engine according to the first embodiment is used, to perform the lean burn operation, for example, a maximum value of the heat release rate (dQ/dθ) described above may be calculated based on the in-cylinder pressure P by the combustion speed parameter calculating section 40a and used as the combustion speed parameter that indicates the speed of combustion of the fuel in the cylinder 14'. In that example, when the speed of combustion of the fuel injected from the fuel injection valve 26 is high, the maximum value of the heat release rate (dQ/dθ) as the combustion speed parameter calculated by the combustion speed parameter calculating section 40a is large. On the other hand, when the speed of combustion of the fuel injected from the fuel injection valve 26 is low, the maximum value of the heat release rate (dQ/dθ) as the combustion speed parameter calculated by the combustion speed parameter calculating section 40a is small.

In the example shown in FIG. 2 in which the controller for an internal combustion engine according to the first embodiment is used, the ECU 40 includes a fuel injection amount controlling section 40d that controls the amount of the fuel injected from the fuel injection valve 26.

More specifically, in the example shown in FIG. 2 in which controller for an internal combustion engine according to the first embodiment is used, the fuel injection amount controlling section 40d performs a fuel injection amount feedforward control during a transient operation of the internal combustion engine 10, for example. For example, during the transient operation of the internal combustion engine 10, a combustion limit excess air ratio calculated by a combustion limit excess air ratio calculating section 40b is used as a target value of the fuel injection amount feedforward control. The combustion limit excess air ratio indicates the excess air ratio that corresponds to a combustion limit (that is, the greatest possible value of the excess air ratio that does not cause deterioration of the combustion). That is, during the transient operation of the internal combustion engine 10, for example, the fuel injection amount controlling section 40d performs the fuel injection amount feedforward control based on the combustion limit excess air ratio.

Furthermore, in the example shown in FIG. 2 in which the controller for an internal combustion engine according to the first embodiment is used, the fuel injection amount controlling section 40d performs a fuel injection amount feedback control during a steady operation of the internal combustion engine 10, for example. For example, during the steady operation of the internal combustion engine 10, a combustion limit combustion speed parameter calculated by a combustion limit combustion speed parameter calculating section 40c is used as a target value of the fuel injection amount feedback control. The combustion limit combustion speed parameter indicates the speed of combustion of the fuel in the cylinder 14' that corresponds to the combustion limit (that is, the fuel combustion speed at the greatest possible excess air ratio that does not cause deterioration of the combustion). That is, during the steady operation of the internal combustion engine 10, for example, the fuel injection amount controlling section 40d performs the fuel injection amount feedback control based on the combustion limit combustion speed parameter.

As a result of earnest study, the inventors have found that the speed of combustion of the fuel in the cylinder 14' changes if the property of the fuel (more specifically, the composition of the fuel) injected from the fuel injection valve 26 changes under an operational condition where the excess air ratio is fixed at a preset value. More specifically, under an operational condition where the excess air ratio is fixed at a preset value, the value of the combustion speed parameter that indicates the speed of combustion of the fuel in the cylinder 14' varies among fuels having different properties.

Figure 3A:
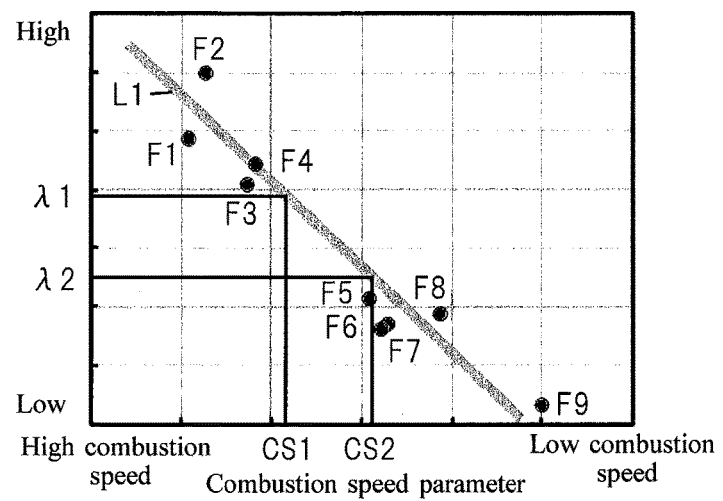
FIGS. 3A and 3B are graphs showing relationships involving a combustion speed parameter that indicates the speed of combustion of fuels F1, F2, . . . , F8 and F9 having different properties in a cylinder 14'.
Figure 3B:
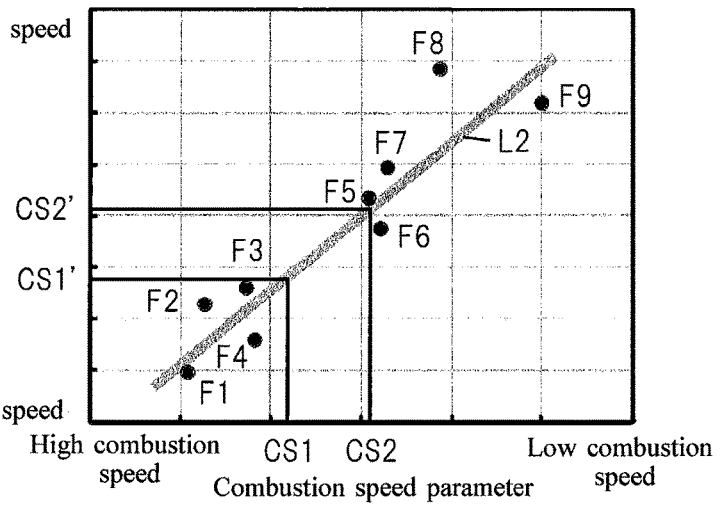

FIGS. 3A and 3B are graphs showing relationships involving the combustion speed parameter that indicates the speed of combustion of fuels F1, F2, . . . , F8 and F9 having different properties in the cylinder 14'. More specifically, FIG. 3A is a graph showing a relationship between the combustion limit excess air ratio and the combustion speed parameter used by the controller for an internal combustion engine according to the first embodiment, and FIG. 3B is a graph showing a relationship between the combustion limit combustion speed parameter and the combustion speed parameter used by the controller for an internal combustion engine according to the first embodiment.

In the example shown in FIGS. 3A and 3B, in the cylinder 14' under the operational condition where the excess air ratio is fixed at a preset value, the fuel F1 has the highest combustion speed (that is, the highest lean combustion tolerance), the fuel F2 has the second highest combustion speed, the fuel F3 has the third highest combustion speed, the fuel F4 has the fourth highest combustion speed, the fuel F5 has the fifth highest combustion speed, the fuel F6 has the sixth highest combustion speed, the fuel F7 has the seventh highest combustion speed, the fuel F8 has the eighth highest combustion speed, and the fuel F9 has the lowest combustion speed.

That is, in the example shown in FIGS. 3A and 3B, the value of the crank angle interval (SA-CA10), as the combustion speed parameter of the fuel F1, calculated by the combustion speed parameter calculating section 40a is the smallest. In other words, the required time for combustion of the fuel F1 under the operational condition where the excess air ratio is fixed at a preset value is the shortest. And the value of the crank angle interval (SA-CA10), as the combustion speed parameter of the fuel F9, calculated by the combustion speed parameter calculating section 40a is the largest. In other words, the required time for combustion of the fuel F9 under the operational condition where the excess air ratio is fixed at a preset value is the longest.

In the example shown in FIGS. 3A and 3B in which the controller for an internal combustion engine according to the first embodiment is used, the speed of combustion of the fuels F1, F2, . . . , F8 and F9 is obtained (that is, the crank angle interval (SA-CA10) as the combustion speed parameter of the fuels F1, F2, . . . , F8 and F9 is calculated) under the operational condition where the excess air ratio is fixed at 1.57. However, in another example in which the controller for an internal combustion engine according to the first embodiment is used, the speed of combustion of the fuels F1, F2, . . . , F8 and F9 may be obtained (that is, the crank angle interval (SA-CA10) as the combustion speed parameter of the fuels F1, F2, . . . , F8 and F9 may be calculated) under the operational condition where the excess air ratio is fixed at an arbitrary value other than 1.57.

As a result of earnest study, the inventors also have found that the value of the combustion limit excess air ratio to be used as the target value of the fuel injection amount feedforward control varies among the fuels F1, F2, . . . , F8 and F9 having different properties, as shown in FIG. 3A.

More specifically, as a result of earnest study, the inventors have found that, as shown by the straight line L1 in FIG. 3A, for the fuels F1, F2, . . . , F8 and F9 having different properties injected from the fuel injection valve 26, the higher the speed of combustion of the fuel in the cylinder 14', the larger the value of the combustion limit excess air ratio is (as can be seen in FIG. 3A, the values of the combustion limit excess air ratio of the fuels F1 and F2 located to the left in the drawing are larger than the values of the combustion limit excess air ratio of the fuels F8 and F9 located to the right in the drawing).

That is, as a result of earnest study, the inventors have found that, when the fuel F1 or F2 that has a high combustion speed in the cylinder 14' is injected from the fuel injection valve 26, the combustion does not deteriorate even if the combustion limit excess air ratio is set at a large value, and rather the emission deteriorates (that is, the amount of NOx emission increases) unless the combustion limit excess air ratio is set at a large value.

In addition, as a result of earnest study, the inventors have found that, when the fuel F8 or F9 that has a low combustion speed in the cylinder 14' is injected from the fuel injection valve 26, the combustion deteriorates and a torque variation occurs unless the combustion limit excess air ratio is set at a small value.

In view of this, with the controller for an internal combustion engine according to the first embodiment, as shown in FIG. 3A, when the combustion speed parameter that indicates the speed of combustion of the fuel in the cylinder 14' changes from a value CS1 to a value CS2 as the property of the fuel injected from the fuel injection valve 26 changes, a combustion limit excess air ratio calculating section 40b changes the combustion limit excess air ratio that is the target value of the fuel injection amount feedforward control from a value λ1 to a value λ2 according to a first relationship shown in FIG. 3A by the straight line L1 that indicates that the combustion limit excess air ratio increases as the speed of combustion of the fuel F1, F2, . . . , F8, F9 in the cylinder 14' increases, for example.

Thus, the controller for an internal combustion engine according to the first embodiment can reduce the possibility that a torque variation occurs during the lean burn operation as a result of the combustion limit excess air ratio being maintained at the value λ1 when the combustion speed parameter changes from the value CS1 to the value CS2, for example, as the property of the fuel injected from the fuel injection valve 26 changes.

More specifically, for example, if the fuel injected from the fuel injection valve 26 changes from a fuel containing less paraffinic constituent to a fuel containing more paraffinic constituent, the speed of combustion of the fuel in the cylinder 14' decreases, and the combustion speed parameter changes from the value CS1 to the value CS2, for example.

Furthermore, with the controller for an internal combustion engine according to the first embodiment, as shown in FIG. 3A, when the combustion speed parameter that indicates the speed of combustion of the fuel in the cylinder 14' changes from the value CS2 to the value CS1 as the property of the fuel injected from the fuel injection valve 26 changes, for example, the combustion limit excess air ratio calculating section 40b changes the combustion limit excess air ratio from the value λ2 to the value λ1 according to the first relationship shown in FIG. 3A by the straight line L1.

Thus, the controller for an internal combustion engine according to the first embodiment can reduce the possibility that the emission deteriorates during the lean burn operation as a result of the combustion limit excess air ratio being maintained at the value λ2 when the combustion speed parameter changes from the value CS2 to the value CS1, for example, as the property of the fuel injected from the fuel injection valve 26 changes.

More specifically, for example, if the fuel injected from the fuel injection valve 26 changes from a fuel containing no alcohol to a fuel containing an alcohol, the speed of combustion of the fuel in the cylinder 14' increases, and the combustion speed parameter changes from the value CS2 to the value CS1, for example.

In the example shown in FIG. 2 in which the controller for an internal combustion engine according to the first embodiment is used, the first relationship shown by the straight line L1 is previously determined by experiment, for example, and stored in a storage portion 40b1 of the combustion limit excess air ratio calculating section 40b, for example.

In the example shown in FIG. 3A in which the controller for an internal combustion engine according to the first embodiment is used, the straight line L1, which is an approximate line, is used to show the first relationship that the combustion limit excess air ratio increases as the speed of combustion of the fuel F1, F2, . . . , F8, F9 in the cylinder 14' increases. However, in another example in which the controller for an internal combustion engine according to the first embodiment is used, any means such as a map other than the straight line may be used to show the first relationship that the combustion limit excess air ratio increases as the speed of combustion of the fuel F1, F2, . . . , F8, F9 in the cylinder 14' increases.

More specifically, with the controller for an internal combustion engine according to the first embodiment, there is no need to grasp whether the fuel injected from the fuel injection valve 26 is the fuel F3 or the fuel F4 when the combustion speed parameter that indicates the speed of combustion of the fuel in the cylinder 14' assumes the value CS1, for example.

Similarly, with the controller for an internal combustion engine according to the first embodiment, there is no need to grasp whether the fuel injected from the fuel injection valve 26 is the fuel F5, the fuel F6 or the fuel F7 when the combustion speed parameter that indicates the speed of combustion of the fuel in the cylinder 14' assumes the value CS2, for example.

That is, with the controller for an internal combustion engine according to the first embodiment, even when the property of the fuel injected from the fuel injection valve 26 changes, stable combustion can be achieved in the lean burn operation without grasping the property of the fuel.

That is, with the controller for an internal combustion engine according to the first embodiment, unlike the example of the internal combustion engine described in JP2007-297951A, when the property of the fuel injected from the fuel injection valve 26 changes, there is no need to grasp the property of the fuel, and stable combustion of the current fuel can be achieved, under the fuel injection amount feedforward control, by grasping the change of the fuel combustion speed due to the change of the property of the fuel (that is, the change of the combustion speed parameter (see the horizontal axis of FIG. 3A) from the value CS1 to the value CS2, for example).

Furthermore, as a result of earnest study, the inventors have found that, as shown in FIG. 3B, the combustion limit combustion speed parameter that indicates the speed of combustion of the fuel in the cylinder 14' that corresponds to the combustion limit (more specifically, the combustion limit due to the excess air ratio being large) to be used as the target value of the fuel injection amount feedback control differs among the fuels F1, F2, . . . , F8 and F9 having different properties.

More specifically, as a result of earnest study, the inventors have found that, as shown by the straight line L2 in FIG. 3B, for the fuels F1, F2, . . . , F8 and F9 having different properties injected from the fuel injection valve 26, the higher the speed of combustion of the fuel in the cylinder 14' at the time when the combustion limit is not reached (see the horizontal axis of FIG. 3B), the higher the speed of combustion of the fuel in the cylinder 14' at the time when the combustion limit is reached (specifically, at the time when the excess air ratio is increased until the combustion limit is reached) (see the vertical axis of FIG. 3B) is (as can be seen in FIG. 3B, the fuel combustion speeds of the fuels F1 and F2 located to the left in the drawing are higher than the fuel combustion speeds of the fuels F8 and F9 located to the right in the drawing).

That is, as a result of earnest study, the inventors have found that, for the fuels F1, F2, . . . , F8 and F9 having different properties injected from the fuel injection valve 26, when the speed of combustion of the fuel F1, F2, . . . , F8, F9 in the cylinder 14' at the time when the combustion limit is not reached (see the horizontal axis of FIG. 3B) increases as the property of the fuel changes, the combustion does not deteriorate even if the speed of combustion of the fuel F1, F2, . . . , F8, F9 in the cylinder 14' corresponding to the combustion limit (more specifically, the combustion limit due to the excess air ratio being high) that corresponds to the target value of the fuel injection amount feedback control (see the horizontal axis of FIG. 3B) is set at a large value, and rather the emission deteriorates unless the speed of combustion of the fuel F1, F2, . . . , F8, F9 in the cylinder 14' corresponding to the combustion limit that corresponds to the target value of the fuel injection amount feedback control is set at a large value.

In addition, as a result of earnest study, the inventors have found that, for the fuels F1, F2, . . . , F8 and F9 having different properties injected from the fuel injection valve 26, when the speed of combustion of the fuel in the cylinder 14' at the time when the combustion limit is not reached decreases as the property of the fuel changes, the combustion deteriorates and a torque variation occurs unless the speed of combustion of the fuel F1, F2, . . . , F8, F9 in the cylinder 14' corresponding to the combustion limit that corresponds to the target value of the fuel injection amount feedback control is set at a small value.

In view of this, with the controller for an internal combustion engine according to the first embodiment, as shown in FIG. 3B, when the combustion speed parameter that indicates the speed of combustion of the fuel in the cylinder 14' changes from the value CS1 to the value CS2 as the property of the fuel injected from the fuel injection valve 26 changes, the combustion limit combustion speed parameter calculating section 40c changes the combustion limit combustion speed parameter that indicates the speed of combustion of the fuel F1, F2, . . . , F8, F9 in the cylinder 14' that corresponds to the combustion limit that is the target value of the fuel injection amount feedback control from a value CS1' to a value CS2' according to a second relationship shown in FIG. 3B by the straight line L2 that indicates that the speed of combustion of the fuel F1, F2, . . . , F8, F9 in the cylinder 14' that corresponds to the combustion limit (more specifically, the combustion limit due to the excess air ratio being high) increases as the speed of combustion of the fuel F1, F2, . . . , F8, F9 in the cylinder 14' increases.

Thus, the controller for an internal combustion engine according to the first embodiment can reduce the possibility that a torque variation occurs during the lean burn operation as a result of the combustion limit combustion speed parameter being maintained at the value CS1' when the combustion speed parameter changes from the value CS1 to the value CS2, for example, as the property of the fuel injected from the fuel injection valve 26 changes.

Furthermore, with the controller for an internal combustion engine according to the first embodiment, as shown in FIG. 3B, when the combustion speed parameter that indicates the speed of combustion of the fuel in the cylinder 14' changes from the value CS2 to the value CS1 as the property of the fuel injected from the fuel injection valve 26 changes, for example, the combustion limit combustion speed parameter calculating section 40c changes the combustion limit combustion speed parameter from the value CS2' to the value CS1' according to the second relationship shown in FIG. 3B by the straight line L2.

Thus, the controller for an internal combustion engine according to the first embodiment can reduce the possibility that the emission deteriorates during the lean burn operation as a result of the combustion limit combustion speed parameter being maintained at the value CS2' when the combustion speed parameter changes from the value CS2 to the value CS1, for example, as the property of the fuel injected from the fuel injection valve 26 changes.

In the example shown in FIG. 2 in which the controller for an internal combustion engine according to the first embodiment is used, the second relationship shown by the straight line L2 is previously determined by experiment, for example, and stored in a storage portion 40c1 of the combustion limit combustion speed parameter calculating section 40c, for example.

In the example shown in FIG. 3B in which the controller for an internal combustion engine according to the first embodiment is used, the straight line L2, which is an approximate line, is used to show the second relationship that the speed of combustion of the fuel F1, F2, . . . , F8, F9 in the cylinder 14' that corresponds to the combustion limit increases as the speed of combustion of the fuel F1, F2, . . . , F8, F9 in the cylinder 14' increases. However, in another example in which the controller for an internal combustion engine according to the first embodiment is used, any means such as a map other than the straight line may be used to show the second relationship that the speed of combustion of the fuel F1, F2, . . . , F8, F9 in the cylinder 14' that corresponds to the combustion limit increases as the speed of combustion of the fuel F1, F2, . . . , F8, F9 in the cylinder 14' increases.

As described above, with the controller for an internal combustion engine according to the first embodiment, there is no need to grasp whether the fuel injected from the fuel injection valve 26 is the fuel F3 or the fuel F4 when the combustion speed parameter that indicates the speed of combustion of the fuel in the cylinder 14' assumes the value CS1, for example.

In addition, with the controller for an internal combustion engine according to the first embodiment, there is no need to grasp whether the fuel injected from the fuel injection valve 26 is the fuel F5, the fuel F6 or the fuel F7 when the combustion speed parameter that indicates the speed of combustion of the fuel in the cylinder 14' assumes the value CS2, for example.

That is, with the controller for an internal combustion engine according to the first embodiment, even when the property of the fuel injected from the fuel injection valve 26 changes, stable combustion can be achieved in the lean burn operation without grasping the property of the fuel.

That is, with the controller for an internal combustion engine according to the first embodiment, unlike the example of the internal combustion engine described in JP2007-297951A, when the property of the fuel injected from the fuel injection valve 26 changes, there is no need to grasp the property of the fuel, and stable combustion of the current fuel can be achieved under the fuel injection amount feedback control by grasping the change of the fuel combustion speed due to the change of the property of the fuel (more specifically, the change of the combustion speed parameter from the value CS1 to the value CS2).

In the example shown in FIG. 2 in which the controller for an internal combustion engine according to the first embodiment is used, during the fuel injection amount feedback control, if the actual combustion speed that corresponds to the combustion speed parameter calculated by the combustion speed parameter calculating section 40*a* is smaller than a target combustion speed that corresponds to the combustion limit combustion speed parameter, the fuel injection amount controlling section 40*d* increases the fuel injection amount to increase the actual combustion speed to the target combustion speed, for example. On the other hand, during the fuel injection amount feedback control, if the actual combustion speed is greater than the target combustion speed, the fuel injection amount controlling section 40*d* reduces the fuel injection amount to reduce the actual combustion speed to the target combustion speed, for example.

FIG. 4 is a flowchart for illustrating a fuel injection amount control performed by the controller for an internal combustion engine according to the first embodiment to achieve the lean burn operation.

When performing the lean burn operation, the controller for an internal combustion engine according to the first embodiment starts the process shown in FIG. 4. First, in Step S100, the ECU 40 determines whether a fuel property learning needs to be performed or not, for example.

For example, when refueling is performed, the property of the fuel injected from the fuel injection valve 26 is like to change. In view of this, in the example shown in FIG. 4 in which the controller for an internal combustion engine according to the first embodiment is used, when refueling is performed, an affirmative determination is made in Step S100.

If the internal combustion engine 10 has been inactive for an extended period, the fuel is likely to become heavy, and the property of the fuel injected from the fuel injection valve 26 is likely to change. In view of this, in the example shown in FIG. 4 in which the controller for an internal combustion engine according to the first embodiment is used, for example, when a preset period has elapsed since the last stop of the internal combustion engine 10 and, as a result, the property of the fuel injected from the fuel injection valve 26 becomes likely to change, an affirmative determination is made in Step S100.

If an affirmative determination is made in Step S100, the process proceeds to Step S101. If a negative determination is made in Step S100, the process proceeds to Step S105.

In the example shown in FIG. 4 in which the controller for an internal combustion engine according to the first embodiment is used, whether the property of the fuel injected from the fuel injection valve 26 has changed or not is determined based on the period having elapsed since the last stop of the internal combustion engine 10. However, in another example in which the controller for an internal combustion engine according to the first embodiment is used, whether the property of the fuel injected from the fuel injection valve 26 has changed or not may be estimated based on the period having elapsed since the last refueling.

In Step S101, the ECU 40 performs learning of the property of the fuel injected from the fuel injection valve 26, for example.

More specifically, at the time of the fuel property learning being performed in Step S101, the fuel injection amount controlling section 40*d* performs the fuel injection amount feedback control with the excess air ratio as the target value of the fuel injection amount feedback control being fixed at a preset value. Furthermore, while the fuel injection amount feedback control is being performed, the combustion speed parameter calculating section 40*a* calculates the combustion speed parameter, such as the crank angle interval (SA-CA10) that is the period in which the crank angle changes from the crank angle SA that corresponds to the ignition timing to the crank angle CA10 at which the mass fraction of burned fuel MFB reaches 10% or the maximum value of the heat release rate (dQ/dθ), for example.

In the example shown in FIGS. 3A and 3B, at the time of the fuel property learning being performed in Step S101, the combustion speed parameter calculating section 40*a* calculates the value CS1 of the combustion speed parameter, for example.

In Step S102, the combustion limit excess air ratio calculating section 40*b* calculates the combustion limit excess air ratio that is the target value of the fuel injection amount feedforward control from the combustion speed parameter calculated by the combustion speed parameter calculating section 40*a* in Step S101 according to the first relationship shown by the straight line L1 in FIG. 3A.

In the example shown in FIGS. 3A and 3B, in Step S102, for example, the combustion limit excess air ratio calculating section 40*b* calculates the value λ1 of the combustion limit excess air ratio from the value CS1 of the combustion speed parameter calculated by the combustion speed parameter calculating section 40*a* in Step S101 according to the first relationship shown by the straight line L1 in FIG. 3A.

In Step S103, the combustion limit combustion speed parameter calculating section 40*c* calculates the combustion limit combustion speed parameter that is the target value of the fuel injection amount feedback control from the combustion speed parameter calculated by the combustion speed parameter calculating section 40*a* in Step S101 according to the second relationship shown by the straight line L2 in FIG. 3B.

In the example shown in FIGS. 3A and 3B, in Step S103, for example, the combustion limit combustion speed parameter calculating section 40*c* calculates the value CS1' of the combustion limit combustion speed parameter from the value CS1 of the combustion speed parameter calculated by the combustion speed parameter calculating section 40*a* in Step S101 according to the second relationship shown by the straight line L2 in FIG. 3B.

In Step S104, the combustion limit excess air ratio calculated by the combustion limit excess air ratio calculating section 40b in Step S102 and the combustion limit combustion speed parameter calculated by the combustion limit combustion speed parameter calculating section 40c in Step S103 are stored in, for example, a backup memory (not shown) of the ECU 40.

In the example shown in FIGS. 3A and 3B, in Step S104, for example, the value λ1 of the combustion limit excess air ratio calculated by the combustion limit excess air ratio calculating section 40b in Step S102 and the value CS1' of the combustion limit combustion speed parameter calculated by the combustion limit combustion speed parameter calculating section 40c in Step S103 are stored in the backup memory of the ECU 40.

In Step S105, during the transient operation of the internal combustion engine 10, for example, the fuel injection amount controlling section 40d performs the fuel injection amount feedforward control by using as the target value the combustion limit excess air ratio stored in the backup memory of the ECU 40, for example. Furthermore, in Step S105, during the steady operation of the internal combustion engine 10, for example, the fuel injection amount controlling section 40d performs the fuel injection amount feedback control by using as the target value the combustion limit combustion speed parameter stored in the backup memory of the ECU 40, for example.

In the example shown in FIGS. 3A and 3B, in Step S105, during the transient operation of the internal combustion engine 10, for example, the fuel injection amount controlling section 40d performs the fuel injection amount feedforward control by using as the target value the value λ1 of the combustion limit excess air ratio, for example. Furthermore, in Step S105, during the steady operation of the internal combustion engine 10, for example, the fuel injection amount controlling section 40d performs the fuel injection amount feedback control by using as the target value the value CS1' of the combustion limit combustion speed parameter, for example.

More specifically, in the example shown in FIGS. 3A and 3B, if the property of the fuel injected from the fuel injection valve 26 does not change, a negative determination is continuously made in Step S100, and in Step S105, the fuel injection amount feedforward control using the value λ1 of the combustion limit excess air ratio as the target value or the fuel injection amount feedback control using the value CS1' of the combustion limit combustion speed parameter as the target value continues.

In the example shown in FIGS. 3A and 3B, if the property of the fuel injected from the fuel injection valve 26 changes, an affirmative determination is made in Step S100, and in Step S101, the value CS2 of the combustion speed parameter after the change is calculated, for example. Furthermore, in Step S102, the value λ2 of the combustion limit excess air ratio after the change is calculated, for example, and the target value of the fuel injection amount feedforward control is changed to the value λ2 of the combustion limit excess air ratio. Furthermore, in step S103, the value CS2' of the combustion limit combustion speed parameter is calculated, for example, and the target value of the fuel injection amount feedback control is changed to the value CS2' of the combustion limit combustion speed parameter.

That is, in the example shown in FIG. 4 in which the controller for an internal combustion engine according to the first embodiment is used, each time refueling, which is likely to cause a change of the property of the fuel injected from the fuel injection valve 26, is performed, an affirmative determination is made in Step S100, and in Step S101, the combustion speed parameter that indicates the speed of combustion of the fuel in the cylinder 14' is calculated. Furthermore, in Step S102, the combustion limit excess air ratio is calculated from the combustion speed parameter according to the first relationship shown by the straight line L1 in FIG. 3A. If the speed of combustion of the fuel in the cylinder 14' changes as a result of the refueling, the combustion limit excess air ratio is changed.

Thus, in the example shown in FIG. 4 in which the controller for an internal combustion engine according to the first embodiment is used, more stable combustion can be achieved in the lean burn operation than in the example where the combustion limit excess air ratio is not changed even if the speed of combustion of the fuel in the cylinder 14' changes as a result of the refueling.

In the example shown in FIG. 4 in which the controller for an internal combustion engine according to the first embodiment is used, each time refueling, which is likely to cause a change of the property of the fuel injected from the fuel injection valve 26, is performed, an affirmative determination is made in Step S100, and in Step S101, the combustion speed parameter that indicates the speed of combustion of the fuel in the cylinder 14' is calculated. Furthermore, in Step S103, the combustion limit combustion speed parameter that indicates the speed of combustion of the fuel in the cylinder 14' that corresponds to the combustion limit (more specifically, the combustion limit due to the excess air ratio being high) is calculated from the combustion speed parameter according to the second relationship shown by the straight line L2 in FIG. 3B. If the speed of combustion of the fuel in the cylinder 14' changes as a result of the refueling, the value of the combustion limit combustion speed parameter that indicates the speed of combustion of the fuel in the cylinder 14' that corresponds to the combustion limit is changed.

Thus, in the example shown in FIG. 4 in which the controller for an internal combustion engine according to the first embodiment is used, more stable combustion can be achieved in the lean burn operation than in the example where the value of the combustion limit combustion speed parameter that indicates the speed of combustion of the fuel in the cylinder 14' that corresponds to the combustion limit is not changed even if the speed of combustion of the fuel in the cylinder 14' changes as a result of the refueling.

Furthermore, in the example shown in FIG. 4 in which the controller for an internal combustion engine according to the first embodiment is used, each time the preset period has elapsed since the last stop of the internal combustion engine 10, and the property of the fuel injected from the fuel injection valve 26 becomes likely to change, an affirmative determination is made in Step S100, and in Step S101, the combustion speed parameter that indicates the speed of combustion of the fuel in the cylinder 14' is calculated. Furthermore, in Step S102, the combustion limit excess air ratio is calculated from the combustion speed parameter according to the first relationship shown by the straight line L1 in FIG. 3A. If the speed of combustion of the fuel in the cylinder 14' changes as a result of the preset period having elapsed since the last stop of the internal combustion engine 10, the combustion limit excess air ratio is changed.

Thus, in the example shown in FIG. 4 in which the controller for an internal combustion engine according to the first embodiment is used, more stable combustion can be achieved in the lean burn operation than in the example where the combustion limit excess air ratio is not changed even if the speed of combustion of the fuel in the cylinder 14' changes as a result of the preset period having elapsed since the last stop of the internal combustion engine 10.

Furthermore, in the example shown in FIG. 4 in which the controller for an internal combustion engine according to the first embodiment is used, each time the preset period has elapsed since the last stop of the internal combustion engine 10, and the property of the fuel injected from the fuel injection valve 26 becomes likely to change, an affirmative determination is made in Step S100, and in Step S101, the combustion speed parameter that indicates the speed of combustion of the fuel in the cylinder 14' is calculated. Furthermore, in Step S103, the combustion limit combustion speed parameter that indicates the speed of combustion of the fuel in the cylinder 14' that corresponds to the combustion limit (more specifically, the combustion limit due to the excess air ratio being high) is calculated from the combustion speed parameter according to the second relationship shown by the straight line L2 in FIG. 3B. If the speed of combustion of the fuel in the cylinder 14' changes as a result of the preset period having elapsed since the last stop of the internal combustion engine 10, the value of the combustion limit combustion speed parameter that indicates the speed of combustion of the fuel in the cylinder 14' that corresponds to the combustion limit is changed.

Thus, in the example shown in FIG. 4 in which the controller for an internal combustion engine according to the first embodiment is used, more stable combustion can be achieved in the lean burn operation than in the example where the value of the combustion limit combustion speed parameter that indicates the speed of combustion of the fuel in the cylinder 14' that corresponds to the combustion limit is not changed even if the speed of combustion of the fuel in the cylinder 14' changes as a result of the preset period having elapsed since the last stop of the internal combustion engine 10.

In the example shown in FIG. 4 in which the controller for an internal combustion engine according to the first embodiment is used, the combustion limit excess air ratio calculated according to the first relationship shown by the straight line L1 in FIG. 3A in Step S102 is used as the target value of the fuel injection amount feedforward control, and the combustion limit combustion speed parameter calculated in Step S103 according to the second relationship shown by the straight line L2 in FIG. 3B is used as the target value of the fuel injection amount feedback control. However, in another example in which the controller for an internal combustion engine according to the first embodiment is used, the combustion limit excess air ratio calculated according to the first relationship shown by the straight line L1 in FIG. 3A in Step S102 may be used as the target value of the fuel injection amount feedforward control, and a value different from that used in the example shown in FIG. 4 may be used as the target value of the fuel injection amount feedback control.

Furthermore, in a further example in which the controller for an internal combustion engine according to the first embodiment is used, alternatively, a value different than that used in the example shown in FIG. 4 may be used as the target value of the fuel injection amount feedforward control, and the combustion limit combustion speed parameter calculated according to the second relationship shown by the straight line L2 in FIG. 3B in Step S103 may be used as the target value of the fuel injection amount feedback control.

Furthermore, in the example shown in FIG. 1 in which the controller for an internal combustion engine according to the first embodiment is used, an EGR operation is performed to improve the emission.

In the example shown in FIG. 2 in which the controller for an internal combustion engine according to the first embodiment is used, the ECU 40 includes an EGR valve controlling section 40g that controls the opening degree of the EGR valve 38.

More specifically, in the example shown in FIG. 2 in which the controller for an internal combustion engine according to the first embodiment is used, for example, during the transient operation of the internal combustion engine 10, the EGR valve controlling section 40g performs an EGR rate feedforward control. For example, during the transient operation of the internal combustion engine 10, a combustion limit EGR rate calculated by a combustion limit EGR rate calculating section 40e is used as a target value of the EGR rate feedforward control. The combustion limit EGR rate indicates the EGR rate that corresponds to the combustion limit (that is, the greatest possible value of the EGR rate that does not cause deterioration of the combustion) and is greater than zero. That is, during the transient operation of the internal combustion engine 10, for example, the EGR valve controlling section 40g performs the EGR rate feedforward control based on the combustion limit EGR rate.

Furthermore, in the example shown in FIG. 2 in which the controller for an internal combustion engine according to the first embodiment is used, the EGR valve controlling section 40g performs an EGR rate feedback control during the steady operation of the internal combustion engine 10, for example. For example, during the steady operation of the internal combustion engine 10, a combustion limit combustion speed parameter calculated by a combustion limit combustion speed parameter calculating section 40f is used as a target value of the EGR rate feedback control. The combustion limit combustion speed parameter indicates the speed of combustion of the fuel in the cylinder 14' that corresponds to the combustion limit (that is, the fuel combustion speed at the greatest possible EGR rate that does not cause deterioration of the combustion (that is, at an EGR valve opening degree greater than zero)). That is, during the steady operation of the internal combustion engine 10, for example, the EGR valve controlling section 40g performs the EGR rate feedback control based on the combustion limit combustion speed parameter.

As a result of earnest study, the inventors have found that the speed of combustion of the fuel in the cylinder 14' changes if the property of the fuel injected from the fuel injection valve 26 changes under an operational condition where the EGR rate is fixed at a preset value. More specifically, under an operational condition where the EGR rate is fixed at a preset value, the value of the combustion speed parameter that indicates the speed of combustion of the fuel in the cylinder 14' varies among fuels having different properties.

FIGS. 5A and 5B are graphs showing relationships involving the combustion speed parameter that indicates the speed of combustion of fuels F1, F2, . . . , F8 and F9 having different properties in the cylinder 14'. More specifically, FIG. 5A is a graph showing a relationship between the combustion limit EGR rate and the combustion speed parameter used by the controller for an internal combustion engine according to the first embodiment, and FIG. 5B is a graph showing a relationship between the combustion limit combustion speed parameter and the combustion speed parameter used by the controller for an internal combustion engine according to the first embodiment.

In the example shown in FIGS. 5A and 5B, in the cylinder 14' under the operational condition where the EGR rate is fixed at a preset value, the fuel F1 has the highest combustion speed, the fuel F2 has the second highest combustion speed, the fuel F3 has the third highest combustion speed, the fuel F4 has the fourth highest combustion speed, the fuel F5 has the fifth highest combustion speed, the fuel F6 has the sixth highest combustion speed, the fuel F7 has the seventh highest combustion speed, the fuel F8 has the eighth highest combustion speed, and the fuel F9 has the lowest combustion speed.

That is, in the example shown in FIGS. 5A and 5B, the value of the crank angle interval (SA-CA10) as the combustion speed parameter of the fuel F1 calculated by the combustion speed parameter calculating section 40a is the smallest. In other words, the required time for combustion of the fuel F1 under the operational condition where the EGR rate is fixed at a preset value is the shortest. And the value of the crank angle interval (SA-CA10) as the combustion speed parameter of the fuel F9 calculated by the combustion speed parameter calculating section 40a is the largest. In other words, the required time for combustion of the fuel F9 under the operational condition where the EGR rate is fixed at a preset value is the longest.

In the example shown in FIGS. 5A and 5B in which the controller for an internal combustion engine according to the first embodiment is used, the speed of combustion of the fuels F1, F2, . . . , F8 and F9 is obtained (that is, the crank angle interval (SA-CA10) as the combustion speed parameter of the fuels F1, F2, . . . , F8 and F9 is calculated) under the operational condition where the EGR rate is fixed at 20%, and the target value of the excess air ratio is set at 1. However, in another example in which the controller for an internal combustion engine according to the first embodiment is used, the speed of combustion of the fuels F1, F2, . . . , F8 and F9 may be obtained (that is, the crank angle interval (SA-CA10) as the combustion speed parameter of the fuels F1, F2, . . . , F8 and F9 may be calculated) under the operational condition where the EGR rate is fixed at an arbitrary value other than 20%.

As a result of earnest study, the inventors also have found that the value of the combustion limit EGR rate to be used as the target value of the EGR rate feedforward control varies among the fuels F1, F2, . . . , F8 and F9 having different properties, as shown in FIG. 5A.

More specifically, as a result of earnest study, the inventors have found that, as shown by a straight line L3 in FIG. 5A, for the fuels F1, F2, . . . , F8 and F9 having different properties injected from the fuel injection valve 26, the higher the speed of combustion of the fuel in the cylinder 14', the larger the value of the combustion limit EGR rate is (as can be seen in FIG. 5A, the values of the combustion limit EGR rate of the fuels F1 and F2 located to the left in the drawing are larger than the values of the combustion limit EGR rate of the fuels F8 and F9 located to the right in the drawing).

That is, as a result of earnest study, the inventors have found that, when the fuel F1 or F2 that has a high combustion speed in the cylinder 14' is injected from the fuel injection valve 26, the combustion does not deteriorate even if the combustion limit EGR rate is set at a large value, and rather the emission deteriorates (that is, the amount of NOx emission increases) unless the combustion limit EGR rate is set at a large value.

In addition, as a result of earnest study, the inventors have found that, when the fuel F8 or F9 that has a low combustion speed in the cylinder 14' is injected from the fuel injection valve 26, the combustion deteriorates unless the combustion limit EGR rate is set at a small value.

In view of this, with the controller for an internal combustion engine according to the first embodiment, as shown in FIG. 5A, when the combustion speed parameter that indicates the speed of combustion of the fuel in the cylinder 14' changes from a value CS3 to a value CS4 as the property of the fuel injected from the fuel injection valve 26 changes, the combustion limit EGR rate calculating section 40e changes the combustion limit EGR rate that is the target value of the EGR rate feedforward control and is greater than zero from a value EGR3 to a value EGR4 according to a third relationship shown in FIG. 5A by the straight line L3 that indicates that the combustion limit EGR rate increases as the speed of combustion of the fuel F1, F2, . . . , F8, F9 in the cylinder 14' increases, for example.

Thus, the controller for an internal combustion engine according to the first embodiment can reduce the possibility that the combustion deteriorates during the EGR operation as a result of the combustion limit EGR rate being maintained at the value EGR3 when the combustion speed parameter changes from the value CS3 to the value CS4, for example, as the property of the fuel injected from the fuel injection valve 26 changes.

Furthermore, with the controller for an internal combustion engine according to the first embodiment, as shown in FIG. 5A, when the combustion speed parameter that indicates the speed of combustion of the fuel in the cylinder 14' changes from the value CS4 to the value CS3 as the property of the fuel injected from the fuel injection valve 26 changes, for example, the combustion limit EGR rate calculating section 40e changes the combustion limit EGR rate from the value EGR4 to the value EGR3 according to the third relationship shown in FIG. 5A by the straight line L3.

Thus, the controller for an internal combustion engine according to the first embodiment can reduce the possibility that the emission deteriorates during the EGR operation as a result of the combustion limit EGR rate being maintained at the value EGR4 when the combustion speed parameter changes from the value CS4 to the value CS3, for example, as the property of the fuel injected from the fuel injection valve 26 changes.

In the example shown in FIG. 2 in which the controller for an internal combustion engine according to the first embodiment is used, the third relationship shown by the straight line L3 is previously determined by experiment, for example, and stored in a storage portion 40e1 of the combustion limit EGR rate calculating section 40e, for example.

In the example shown in FIG. 5A in which the controller for an internal combustion engine according to the first embodiment is used, the straight line L3, which is an approximate line, is used to show the third relationship that the combustion limit EGR rate increases as the speed of combustion of the fuel F1, F2, . . . , F8, F9 in the cylinder 14' increases. However, in another example in which the controller for an internal combustion engine according to the first embodiment is used, any means such as a map other than the straight line may be used to show the third relationship that the combustion limit EGR rate increases as the speed of combustion of the fuel F1, F2, . . . , F8, F9 in the cylinder 14' increases.

More specifically, with the controller for an internal combustion engine according to the first embodiment, there is no need to grasp whether the fuel injected from the fuel injection valve 26 is the fuel F4 or the fuel F5 when the combustion speed parameter that indicates the speed of combustion of the fuel in the cylinder 14' assumes the value CS3, for example.

Similarly, with the controller for an internal combustion engine according to the first embodiment, there is no need to grasp whether the fuel injected from the fuel injection valve 26 is the fuel F8 or the fuel F9 when the combustion speed parameter that indicates the speed of combustion of the fuel in the cylinder 14' assumes the value CS4, for example.

That is, with the controller for an internal combustion engine according to the first embodiment, even when the property of the fuel injected from the fuel injection valve 26 changes, stable combustion can be achieved in the EGR operation without grasping the property of the fuel.

That is, with the controller for an internal combustion engine according to the first embodiment, unlike the example of the internal combustion engine described in JP2007-297951A, when the property of the fuel injected from the fuel injection valve 26 changes, there is no need to grasp the property of the fuel, and stable combustion of the current fuel can be achieved under the EGR rate feedforward control by grasping the change of the fuel combustion speed due to the change of the property of the fuel (more specifically, the change of the combustion speed parameter (see the horizontal axis of FIG. 5A) from the value CS3 to the value CS4, for example).

In the example shown in FIG. 2 in which the controller for an internal combustion engine according to the first embodiment is used, during the EGR rate feedforward control, if the actual EGR rate is smaller than the combustion limit EGR rate that is the target value of the EGR rate feedforward control, the EGR valve controlling section 40g increases the opening degree of the EGR valve 38 to increase the actual EGR rate to a target value, for example. On the other hand, during the EGR rate feedforward control, if the actual EGR rate is greater than the target value, the EGR valve controlling section 40g reduces the opening degree of the EGR valve 38 to reduce the actual EGR rate to the target value.

In the example shown in FIG. 2 in which the controller for an internal combustion engine according to the first embodiment is used, the actual EGR rate can be calculated in a method described in the paragraphs 0165 to 0167 of JP2001-164999A, for example. Specifically, in this example, the EGR rate is calculated from the total amount of intake air taken into the internal combustion engine 10 (the sum of the amount of fresh air taken into the internal combustion engine 10 and the amount of the EGR gas) and the amount of fresh air detected by the air flow sensor 44. More specifically, the total amount of the intake air taken into the internal combustion engine 10 is calculated as a product of an intake air pressure detected by a pressure sensor (not shown) disposed in the intake channel 16 and an intake pipe-based charging efficiency specific to the internal combustion engine 10. The intake pipe-based charging efficiency is expressed as a function of the engine speed or previously determined by experiment, for example.

Alternatively, in another example in which the controller for an internal combustion engine according to the first embodiment is used, the actual EGR rate may be calculated from the in-cylinder pressure P detected by the in-cylinder pressure sensor 30 in the method described in the paragraph 0029 of Japanese Patent No. 5601232, for example.

Furthermore, as a result of earnest study, the inventors have found that, as shown in FIG. 5B, the value of the combustion limit combustion speed parameter that indicates the speed of combustion of the fuel in the cylinder 14' that corresponds to the combustion limit (more specifically, the combustion limit due to the EGR rate being high) to be used as the target value of the EGR rate feedback control differs among the fuels F1, F2, . . . , F8 and F9 having different properties.

More specifically, as a result of earnest study, the inventors have found that, as shown by the straight line L4 in FIG. 5B, for the fuels F1, F2, . . . , F8 and F9 having different properties injected from the fuel injection valve 26, the higher the speed of combustion of the fuel in the cylinder 14' at the time when the combustion limit is not reached (see the horizontal axis of FIG. 5B), the higher the speed of combustion of the fuel in the cylinder 14' when the combustion limit is reached (see the vertical axis of FIG. 5B) is (as can be seen in FIG. 5B, the fuel combustion speeds of the fuels F1 and F2 located to the left in the drawing are higher than the fuel combustion speeds of the fuels F8 and F9 located to the right in the drawing).

That is, as a result of earnest study, the inventors have found that, for the fuels F1, F2, . . . , F8 and F9 having different properties injected from the fuel injection valve 26, when the speed of combustion of the fuel in the cylinder 14' at the time when the combustion limit is not reached increases as the property of the fuel changes, the combustion does not deteriorate even if the speed of combustion of the fuel F1, F2, . . . , F8, F9 in the cylinder 14' corresponding to the combustion limit (more specifically, the combustion limit due to the EGR rate being high) that corresponds to the target value of the EGR rate feedback control is set at a large value, and rather the emission deteriorates unless the speed of combustion of the fuel F1, F2, . . . , F8, F9 in the cylinder 14' corresponding to the combustion limit that corresponds to the target value of the EGR rate feedback control is set at a large value.

In addition, as a result of earnest study, the inventors have found that, for the fuels F1, F2, . . . , F8 and F9 having different properties injected from the fuel injection valve 26, when the speed of combustion of the fuel in the cylinder 14' at the time when the combustion limit is not reached decreases as the property of the fuel changes, the combustion deteriorates unless the speed of combustion of the fuel in the cylinder 14' corresponding to the combustion limit that corresponds to the target value of the EGR rate feedback control is set at a small value.

In view of this, with the controller for an internal combustion engine according to the first embodiment, as shown in FIG. 5B, when the combustion speed parameter that indicates the speed of combustion of the fuel in the cylinder 14' changes from the value CS3 to the value CS4 as the property of the fuel injected from the fuel injection valve 26 changes, for example, the combustion limit combustion speed parameter calculating section 40f changes the combustion limit combustion speed parameter that indicates the speed of combustion of the fuel F1, F2, . . . , F8, F9 in the cylinder 14' that corresponds to the combustion limit that is the target value of the EGR rate feedback control from a value CS3' to a value CS4' according to a fourth relationship shown in FIG. 5B by the straight line L4 that indicates that the speed of combustion of the fuel F1, F2, . . . , F8, F9 in the cylinder 14' that corresponds to the combustion limit (more specifically, the combustion limit due to the EGR rate being high) increases as the speed of combustion of the fuel F1, F2, . . . , F8, F9 in the cylinder 14' increases.

Thus, the controller for an internal combustion engine according to the first embodiment can reduce the possibility that the combustion deteriorates during the EGR operation as a result of the combustion limit combustion speed parameter being maintained at the value CS3' when the combustion speed parameter changes from the value CS3 to the value CS4, for example, as the property of the fuel injected from the fuel injection valve 26 changes.

Furthermore, with the controller for an internal combustion engine according to the first embodiment, as shown in FIG. 5B, when the combustion speed parameter that indicates the speed of combustion of the fuel in the cylinder 14' changes from the value CS4 to the value CS3 as the property of the fuel injected from the fuel injection valve 26 changes, for example, the combustion limit combustion speed parameter calculating section 40f changes the combustion limit combustion speed parameter from the value CS4' to the value CS3' according to the fourth relationship shown in FIG. 5B by the straight line L4.

Thus, the controller for an internal combustion engine according to the first embodiment can reduce the possibility that the emission deteriorates during the EGR operation as a result of the combustion limit combustion speed parameter being maintained at the value CS4' when the combustion speed parameter changes from the value CS4 to the value CS3, for example, as the property of the fuel injected from the fuel injection valve 26 changes.

In the example shown in FIG. 2 in which the controller for an internal combustion engine according to the first embodiment is used, the fourth relationship shown by the straight line L4 is previously determined by experiment, for example, and stored in a storage portion 40f1 of the combustion limit combustion speed parameter calculating section 40f, for example.

In the example shown in FIG. 5B in which the controller for an internal combustion engine according to the first embodiment is used, the straight line L4, which is an approximate line, is used to show the fourth relationship that the speed of combustion of the fuel F1, F2, . . . , F8, F9 in the cylinder 14' that corresponds to the combustion limit increases as the speed of combustion of the fuel F1, F2, . . . , F8, F9 in the cylinder 14' increases. However, in another example in which the controller for an internal combustion engine according to the first embodiment is used, any means such as a map other than the straight line may be used to show the fourth relationship that the speed of combustion of the fuel F1, F2, . . . , F8, F9 in the cylinder 14' that corresponds to the combustion limit increases as the speed of combustion of the fuel F1, F2, . . . , F8, F9 in the cylinder 14' increases.

As described above, with the controller for an internal combustion engine according to the first embodiment, there is no need to grasp whether the fuel injected from the fuel injection valve 26 is the fuel F4 or the fuel F5 when the combustion speed parameter that indicates the speed of combustion of the fuel in the cylinder 14' assumes the value CS3, for example.

In addition, with the controller for an internal combustion engine according to the first embodiment, there is no need to grasp whether the fuel injected from the fuel injection valve 26 is the fuel F8 or the fuel F9 when the combustion speed parameter that indicates the speed of combustion of the fuel in the cylinder 14' assumes the value CS4, for example.

That is, with the controller for an internal combustion engine according to the first embodiment, even when the property of the fuel injected from the fuel injection valve 26 changes, stable combustion can be achieved in the EGR operation without grasping the property of the fuel.

That is, with the controller for an internal combustion engine according to the first embodiment, unlike the example of the internal combustion engine described in JP2007-297951A, when the property of the fuel injected from the fuel injection valve 26 changes, there is no need to grasp the property of the fuel, and stable combustion of the current fuel can be achieved under the EGR rate feedback control by grasping the change of the fuel combustion speed due to the change of the property of the fuel (more specifically, the change of the combustion speed parameter from the value CS3 to the value CS4).

In the example shown in FIG. 2 in which the controller for an internal combustion engine according to the first embodiment is used, during the EGR rate feedback control, if the actual combustion speed that corresponds to the combustion speed parameter calculated by the combustion speed parameter calculating section 40a is smaller than a target combustion speed that corresponds to the combustion limit combustion speed parameter that is the target value of the EGR feedback control, the EGR valve controlling section 40g reduces the opening degree of the EGR valve 38 to increase the actual combustion speed to the target combustion speed, for example. On the other hand, during the EGR rate feedback control, if the actual combustion speed is greater than the target combustion speed, the EGR valve controlling section 40g increases the opening degree of the EGR valve 38 to reduce the actual combustion speed to the target combustion speed, for example.

Figure 6:
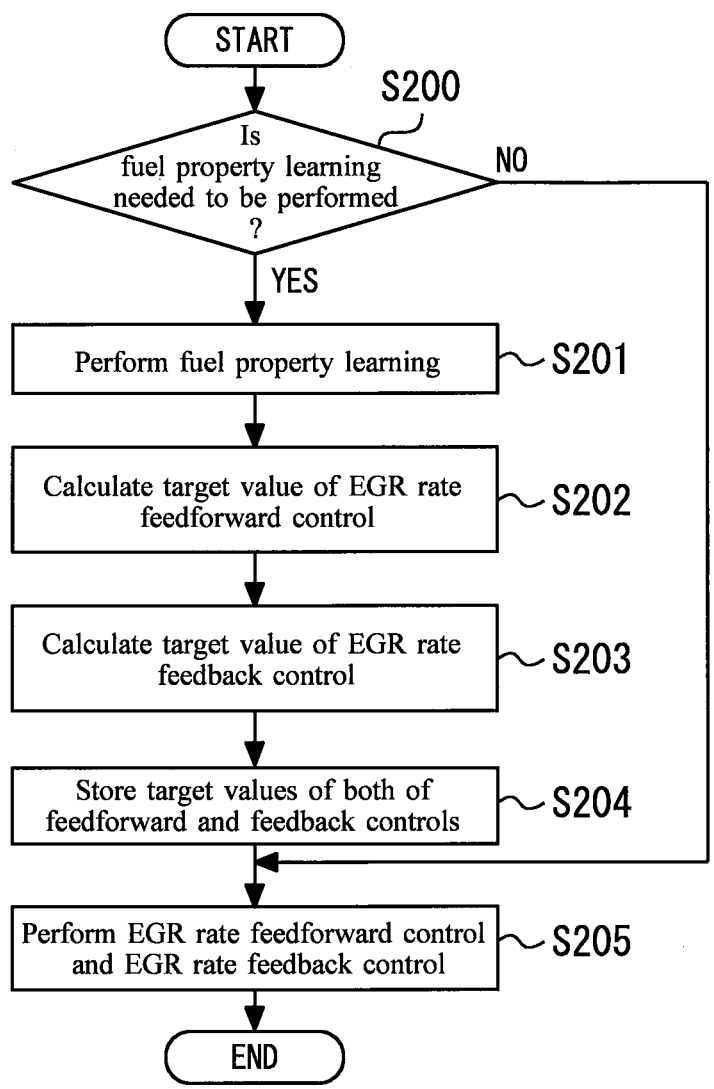
FIG. 6 is a flowchart for illustrating an EGR valve control performed by the controller for an internal combustion engine according to the first embodiment to achieve an EGR operation.

FIG. 6 is a flowchart for illustrating an EGR valve control performed by the controller for an internal combustion engine according to the first embodiment to achieve the EGR operation.

When performing the EGR operation, the controller for an internal combustion engine according to the first embodiment starts the process shown in FIG. 6. First, in Step S200, the ECU 40 determines whether a fuel property learning needs to be performed or not, for example.

For example, when refueling is performed, the property of the fuel injected from the fuel injection valve 26 is like to change. In view of this, in the example shown in FIG. 6 in which the controller for an internal combustion engine according to the first embodiment is used, when refueling is performed, an affirmative determination is made in Step S200.

If the internal combustion engine 10 has been inactive for an extended period, the fuel is likely to become heavy, and the property of the fuel injected from the fuel injection valve 26 becomes likely to change. In view of this, in the example shown in FIG. 6 in which the controller for an internal combustion engine according to the first embodiment is used, for example, when a preset period has elapsed since the last stop of the internal combustion engine 10 and, as a result, the property of the fuel injected from the fuel injection valve 26 becomes likely to change, an affirmative determination is made in Step S200.

If an affirmative determination is made in Step S200, the process proceeds to Step S201. If a negative determination is made in Step S200, the process proceeds to Step S205.

In the example shown in FIG. 6 in which the controller for an internal combustion engine according to the first embodiment is used, whether the property of the fuel injected from the fuel injection valve 26 has changed or not is determined based on the period having elapsed since the last stop of the internal combustion engine 10. However, in another example in which the controller for an internal combustion engine according to the first embodiment is used, whether the property of the fuel injected from the fuel injection valve 26 has changed or not may be estimated based on the period having elapsed since the last refueling.

In Step S201, the ECU 40 performs learning of the property of the fuel injected from the fuel injection valve 26, for example.

More specifically, at the time of the fuel property learning being performed in Step S201, the EGR valve controlling section 40g performs the EGR rate feedback control with the EGR rate as the target value of the EGR rate feedback control being fixed at a preset value. Furthermore, while the EGR rate feedback control is being performed, the combustion speed parameter calculating section 40a calculates the combustion speed parameter, such as the crank angle interval (SA-CA10) that is the period in which the crank angle changes from the crank angle SA that corresponds to the ignition timing to the crank angle CA10 at which the mass fraction of burned fuel MFB reaches 10% or the maximum value of the heat release rate (dQ/dθ), for example.

In the example shown in FIGS. 5A and 5B, at the time of the fuel property learning being performed in Step S201, the combustion speed parameter calculating section 40a calculates the value CS3 of the combustion speed parameter, for example.

In Step S202, the combustion limit EGR rate calculating section 40e calculates the combustion limit EGR rate that is the target value of the EGR rate feedforward control and is greater than zero from the combustion speed parameter calculated by the combustion speed parameter calculating section 40a in Step S201 according to the third relationship shown by the straight line L3 in FIG. 5A.

In the example shown in FIGS. 5A and 5B, in Step S202, for example, the combustion limit EGR rate calculating section 40e calculates the value EGR3 of the combustion limit EGR rate from the value CS3 of the combustion speed parameter calculated by the combustion speed parameter calculating section 40a in Step S201 according to the third relationship shown by the straight line L3 in FIG. 5A.

In Step S203, the combustion limit combustion speed parameter calculating section 40f calculates the combustion limit combustion speed parameter that is the target value of the EGR rate feedback control from the combustion speed parameter calculated by the combustion speed parameter calculating section 40a in Step S201 according to the fourth relationship shown by the straight line L4 in FIG. 5B.

In the example shown in FIGS. 5A and 5B, in Step S203, for example, the combustion limit combustion speed parameter calculating section 40f calculates the value CS3' of the combustion limit combustion speed parameter from the value CS3 of the combustion speed parameter calculated by the combustion speed parameter calculating section 40a in Step S201 according to the fourth relationship shown by the straight line L4 in FIG. 5B.

In Step S204, the combustion limit EGR rate calculated by the combustion limit EGR rate calculating section 40e in Step S202 and the combustion limit combustion speed parameter calculated by the combustion limit combustion speed parameter calculating section 40f in Step S203 are stored in, for example, the backup memory of the ECU 40.

In the example shown in FIGS. 5A and 5B, in Step S204, for example, the value EGR3 of the combustion limit EGR rate calculated by the combustion limit EGR rate calculating section 40e in Step S202 and the value CS3' of the combustion limit combustion speed parameter calculated by the combustion limit combustion speed parameter calculating section 40f in Step S203 are stored in the backup memory of the ECU 40.

In Step S205, during the transient operation of the internal combustion engine 10, for example, the EGR valve controlling section 40g performs the EGR rate feedforward control by using as the target value the combustion limit EGR rate stored in the backup memory of the ECU 40, for example. Furthermore, in Step S205, during the steady operation of the internal combustion engine 10, for example, the EGR valve controlling section 40g performs the EGR rate feedback control by using as the target value the combustion limit combustion speed parameter stored in the backup memory of the ECU 40, for example.

In the example shown in FIGS. 5A and 5B, in Step S205, during the transient operation of the internal combustion engine 10, for example, the EGR valve controlling section 40g performs the EGR rate feedforward control by using as the target value the value EGR3 of the combustion limit EGR rate, for example. Furthermore, in Step S205, during the steady operation of the internal combustion engine 10, for example, the EGR valve controlling section 40g performs the EGR rate feedback control by using as the target value the value CS3' of the combustion limit combustion speed parameter, for example.

More specifically, in the example shown in FIGS. 5A and 5B, if the property of the fuel injected from the fuel injection valve 26 does not change, a negative determination is continuously made in Step S200, and in Step S205, the EGR rate feedforward control using the value EGR3 of the combustion limit EGR rate as the target value or the EGR rate feedback control using the value CS3' of the combustion limit combustion speed parameter as the target value continues.

In the example shown in FIGS. 5A and 5B, if the property of the fuel injected from the fuel injection valve 26 changes, an affirmative determination is made in Step S200, and in Step S201, the value CS4 of the combustion speed parameter after the change is calculated, for example. Furthermore, in Step S202, the value EGR4 of the combustion limit EGR rate after the change is calculated, for example, and the target value of the EGR rate feedforward control is changed to the value EGR4 of the combustion limit EGR rate. Furthermore, In step S203, the value CS4' of the combustion limit combustion speed parameter is calculated, for example, and the target value of the EGR rate feedback control is changed to the value CS4' of the combustion limit combustion speed parameter.

That is, in the example shown in FIG. 6 in which the controller for an internal combustion engine according to the first embodiment is used, each time refueling, which is likely to cause a change of the property of the fuel injected from the fuel injection valve 26, is performed, an affirmative determination is made in Step S200, and in Step S201, the combustion speed parameter that indicates the speed of combustion of the fuel in the cylinder 14' is calculated. Furthermore, in Step S202, the combustion limit EGR rate is calculated from the combustion speed parameter according to the third relationship shown by the straight line L3 in FIG. 5A. If the speed of combustion of the fuel in the cylinder 14' changes as a result of the refueling, the combustion limit EGR rate is changed.

Thus, in the example shown in FIG. 6 in which the controller for an internal combustion engine according to the first embodiment is used, more stable combustion can be achieved in the EGR operation than in the example where the combustion limit EGR rate is not changed even if the speed of combustion of the fuel in the cylinder 14' changes as a result of the refueling.

In the example shown in FIG. 6 in which the controller for an internal combustion engine according to the first embodiment is used, each time refueling, which is likely to cause a change of the property of the fuel injected from the fuel injection valve 26, is performed, an affirmative determination is made in Step S200, and in Step S201, the combustion speed parameter that indicates the speed of combustion of the fuel in the cylinder 14' is calculated. Furthermore, in Step S203, the combustion limit combustion speed parameter is calculated from the combustion speed parameter according to the fourth relationship shown by the straight line L4 in FIG. 5B. If the speed of combustion of the fuel in the cylinder 14' changes as a result of the refueling, the value of the combustion limit combustion speed parameter is changed.

Thus, in the example shown in FIG. 6 in which the controller for an internal combustion engine according to the first embodiment is used, more stable combustion can be achieved in the EGR operation than in the example where the value of the combustion limit combustion speed parameter is not changed even if the speed of combustion of the fuel in the cylinder 14' changes as a result of the refueling.

Furthermore, in the example shown in FIG. 6 in which the controller for an internal combustion engine according to the first embodiment is used, each time the preset period has elapsed since the last stop of the internal combustion engine 10, and the property of the fuel injected from the fuel injection valve 26 becomes likely to change, an affirmative determination is made in Step S200, and in Step S201, the combustion speed parameter that indicates the speed of combustion of the fuel in the cylinder 14' is calculated. Furthermore, in Step S202, the combustion limit EGR rate is calculated from the combustion speed parameter according to the third relationship shown by the straight line L3 in FIG. 5A. If the speed of combustion of the fuel in the cylinder 14' changes as a result of the preset period having elapsed since the last stop of the internal combustion engine 10, the combustion limit EGR rate is changed.

Thus, in the example shown in FIG. 6 in which the controller for an internal combustion engine according to the first embodiment is used, more stable combustion can be achieved in the EGR operation than in the example where the combustion limit EGR rate is not changed even if the speed of combustion of the fuel in the cylinder 14' changes as a result of the preset period having elapsed since the last stop of the internal combustion engine 10.

Furthermore, in the example shown in FIG. 6 in which the controller for an internal combustion engine according to the first embodiment is used, each time the preset period has elapsed since the last stop of the internal combustion engine 10, and the property of the fuel injected from the fuel injection valve 26 becomes likely to change, an affirmative determination is made in Step S200, and in Step S201, the combustion speed parameter that indicates the speed of combustion of the fuel in the cylinder 14' is calculated. Furthermore, in Step S203, the combustion limit combustion speed parameter is calculated from the combustion speed parameter according to the fourth relationship shown by the straight line L4 in FIG. 5B. If the speed of combustion of the fuel in the cylinder 14' changes as a result of the preset period having elapsed since the last stop of the internal combustion engine 10, the value of the combustion limit combustion speed parameter is changed.

Thus, in the example shown in FIG. 6 in which the controller for an internal combustion engine according to the first embodiment is used, more stable combustion can be achieved in the EGR operation than in the example where the value of the combustion limit combustion speed parameter is not changed even if the speed of combustion of the fuel in the cylinder 14' changes as a result of the preset period having elapsed since the last stop of the internal combustion engine 10.

In the example shown in FIG. 6 in which the controller for an internal combustion engine according to the first embodiment is used, the combustion limit EGR rate calculated according to the third relationship shown by the straight line L3 in FIG. 5A in Step S202 is used as the target value of the EGR rate feedforward control, and the combustion limit combustion speed parameter calculated in Step S203 according to the fourth relationship shown by the straight line L4 in FIG. 5B is used as the target value of the EGR rate feedback control. However, in another example in which the controller for an internal combustion engine according to the first embodiment is used, the combustion limit EGR rate calculated according to the third relationship shown by the straight line L3 in FIG. 5A in Step S202 may be used as the target value of the EGR rate feedforward control, and a value different from that used in the example shown in FIG. 6 may be used as the target value of the EGR rate feedback control.

Furthermore, in a further example in which the controller for an internal combustion engine according to the first embodiment is used, alternatively, a value different than that used in the example shown in FIG. 6 may be used as the target value of the EGR rate feedforward control, and the combustion limit combustion speed parameter calculated according to the fourth relationship shown by the straight line L4 in FIG. 5B in Step S203 may be used as the target value of the EGR rate feedback control.

In the example shown in FIGS. 1 and 6 in which the controller for an internal combustion engine according to the first embodiment is used, the EGR channel 36 and the EGR valve 38 are provided, and the EGR valve control is performed in Step S205. However, in another example in which the controller for an internal combustion engine according to the first embodiment is used, the EGR channel 36 and the EGR valve 38 may be omitted.

As described above, in the example shown in FIGS. 4 and 6 in which the controller for an internal combustion engine according to the first embodiment is used, the combustion limit excess air ratio calculated according to the first relationship shown by the straight line L1 in FIG. 3A in Step S102 is used as the target value of the fuel injection amount feedforward control, the combustion limit combustion speed parameter calculated according to the second relationship shown by the straight line L2 in FIG. 3B in Step S103 is used as the target value of the fuel injection amount feedback control, the combustion limit EGR rate calculated according to the third relationship shown by the straight line L3 in FIG. 5A in Step S202 is used as the target value of the EGR rate feedforward control, and the combustion limit combustion speed parameter calculated according to the fourth relationship shown by the straight line L4 in FIG. 5B in Step S203 is used as the target value of the EGR rate feedback control.

Alternatively, in another example in which the controller for an internal combustion engine according to the first embodiment is used, a value different from that used in the example shown in FIG. 4 may be used as the target value of the fuel injection amount feedforward control, a value different from that used in the example shown in FIG. 4 may be used as the target value of the fuel injection amount feedback control, the combustion limit EGR rate calculated according to the third relationship shown by the straight line L3 in FIG. 5A in Step S202 may be used as the target value of the EGR rate feedforward control, and the combustion limit combustion speed parameter calculated according to the fourth relationship shown by the straight line L4 in FIG. 5B in Step S203 may be used as the target value of the EGR rate feedback control.

FIGS. 7A and 7B are graphs for illustrating a phenomenon observed in the earnest study by the inventors. Specifically, FIG. 7A is a graph showing a relationship between the excess air ratio and a coefficient of variance (COV) of an indicated mean effective pressure (IMEP). FIG. 7B is a graph showing a relationship between the excess air ratio and the combustion speed parameter.

In FIG. 7A, the point PA denotes a point used to determine a value λa of the combustion limit excess air ratio (more specifically, an excess air ratio at a combustion limit due to the excess air ratio being high) of a fuel FA. Specifically, in the example shown in FIG. 7A, the COV of the IMEP of the fuel FA starts increasing at the point PA as the excess air ratio increases, and the value λa of the excess air ratio at the point PA is defined as the combustion limit excess air ratio of the fuel FA. FIG. 7B shows that, under an operational condition where the excess air ratio is fixed at the value λa, the combustion speed parameter calculating section 40a calculates a value CSa of the combustion speed parameter of the fuel FA.

Similarly, in FIG. 7A, the point PB denotes a point used to determine a value λb of the combustion limit excess air ratio of a fuel FB having a different property than the fuel FA. FIG. 7B shows that, under an operational condition where the excess air ratio is fixed at the value λb, the combustion speed parameter calculating section 40a calculates a value CSb of the combustion speed parameter of the fuel FB.

In FIG. 7A, the point PC denotes a point used to determine a value λc of the combustion limit excess air ratio of a fuel FC having a different property than the fuels FA and FB. FIG. 7B shows that, under an operational condition where the excess air ratio is fixed at the value λc, the combustion speed parameter calculating section 40a calculates a value CSc of the combustion speed parameter of the fuel FC.

In the same manner as described above, points representing the fuels F1, F2, . . . , F8 and F9 shown in FIG. 3A that indicate the relationship between the combustion speed parameter and the combustion limit excess air ratio are plotted.

In the example shown in FIG. 7B, for example, under the operational condition where the excess air ratio is fixed at the value λa, the fuel FA has the lowest combustion speed, the fuel FB has the second lowest combustion speed, and the fuel FC has the highest combustion speed.

As shown in FIGS. 7A and 7B, the value λc of the combustion limit excess air ratio of the fuel FC having the highest combustion speed is the largest, the value λb of the combustion limit excess air ratio of the fuel FB having the second highest combustion speed is the second largest, and the value λa of the combustion limit excess air ratio of the fuel FA having the lowest combustion speed is the smallest.

Furthermore, as shown in FIGS. 7A and 7B, the combustion speed (the value CSc of the combustion speed parameter) of the fuel FC having the highest combustion speed at the time when the combustion limit is reached (specifically, at the time when the excess air ratio is increased until the combustion limit is reached) is the highest, the combustion speed (the value CSb of the combustion speed parameter) of the fuel FB having the second highest combustion speed at the time when the combustion limit is reached is the second highest, and the combustion speed (the value CSa of the combustion speed parameter) of the fuel FA having the lowest combustion speed at the time when the combustion limit is reached is the lowest.

That is, as a result of earnest study, the inventors have found that the fuels FA, FB and FC having different properties have different combustion speeds at the time when the combustion limit is reached (specifically, at the time when the excess air ratio is increased until the combustion limit is reached). Thus, the fuel injection amount control shown in FIG. 4 that takes the properties of the fuels into consideration is required.

Furthermore, as a result of earnest study, the inventors have found that fuels having different properties have different combustion speeds at the time when the EGR rate is increased until the combustion limit is reached. Thus, the EGR valve control shown in FIG. 6 that takes the properties of the fuels into consideration is required.

In the following, a controller for an internal combustion engine according to a second embodiment of the present disclosure will be described.

The controller for an internal combustion engine according to the second embodiment has basically the same configuration as the controller for an internal combustion engine according to the first embodiment described above except for the points described below. Thus, the controller for an internal combustion engine according to the second embodiment has basically the same effects as the controller for an internal combustion engine according to the first embodiment described above except for the points described below.

Figure 8:
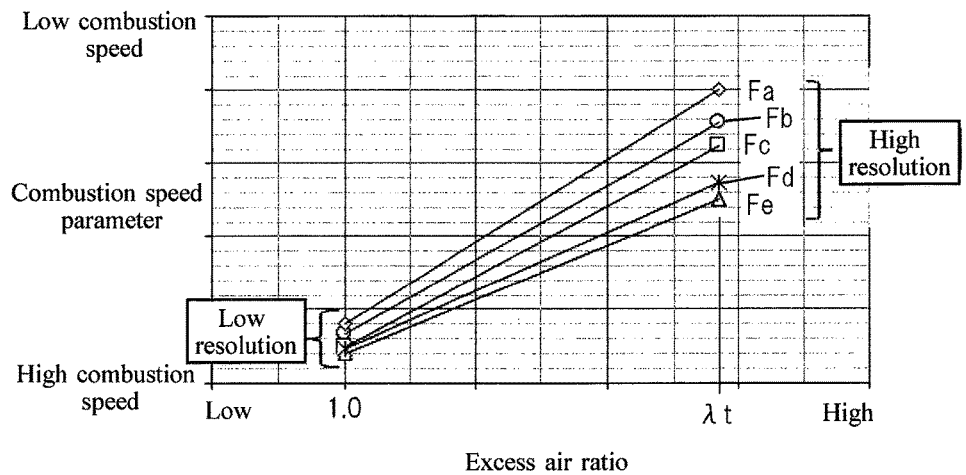
FIG. 8 is a graph for illustrating the effect of fixing the value of the excess air ratio when determining the combustion speed of the fuel.

FIG. 8 is a graph for illustrating the effect of fixing the value of the excess air ratio when determining the combustion speed of the fuel. In FIG. 8, the horizontal axis indicates the excess air ratio fixed as the target value of the fuel injection amount feedback control when the fuel property learning is performed, and the vertical axis indicates the combustion speed parameter.

As described above, in the example shown in FIG. 4 in which the controller for an internal combustion engine according to the first embodiment is used, the fuel property learning is performed in Step S101. More specifically, in Step S101, the fuel injection amount feedback control is performed with the excess air ratio as the target value of the fuel injection amount feedback control being fixed at a preset value, and while the fuel injection amount feedback control is being performed, the combustion speed parameter that indicates the fuel combustion speed, such as the crank angle interval (SA-CA10), is calculated.

When the fuel property learning is performed, as shown in FIG. 8, if the value of the excess air ratio as the target value of the fuel injection amount feedback control is fixed at 1.0, the fuels Fa, Fb, Fc, Fd and Fe have greater combustion speeds than if the excess air ratio as the target value of the fuel injection amount feedback control is fixed at a value λt greater than 1.0. That is, if the value of the excess air ratio as the target value of the fuel injection amount feedback control is fixed at 1.0, the required times for combustion of the fuels Fa, Fb, Fc, Fd and Fe are shorter than if the excess air ratio as the target value of the fuel injection amount feedback control is fixed at the value AA greater than 1.0. Thus, the differences in required time for combustion between the fuels Fa, Fb, Fc, Fd and Fe are smaller.

As a result, when the fuel property learning is performed, as shown in FIG. 8, if the value of the excess air ratio as the target value of the fuel injection amount feedback control is fixed at 1.0, the resolution for discriminating between the combustion speeds of the fuels Fa, Fb, Fc, Fd and Fe is lower than if the excess air ratio as the target value of the fuel injection amount feedback control is fixed at the value λt greater than 1.0.

On the other hand, when the fuel property learning is performed, as shown in FIG. 8, if the excess air ratio as the target value of the fuel injection amount feedback control is fixed at the value λt greater than 1.0, the combustion speeds of the fuels Fa, Fb, Fc, Fd and Fe are lower than if the value of the excess air ratio is fixed at 1.0. That is, the required times for combustion of the fuels Fa, Fb, Fc, Fd and Fe are longer. Thus, the differences in required time for combustion between the fuels Fa, Fb, Fc, Fd and Fe are larger.

As a result, when the fuel property learning is performed, as shown in FIG. 8, if the excess air ratio as the target value of the fuel injection amount feedback control is fixed at the value λt greater than 1.0, the resolution for discriminating between the combustion speeds of the fuels Fa, Fb, Fc, Fd and Fe is higher than if the value of the excess air ratio is fixed at 1.0.

In view of the points described above, with the controller for an internal combustion engine according to the second embodiment, when the fuel property learning is performed, that is, when the fuel injection amount feedback control is being performed to calculate the combustion speed parameter (see the horizontal axes of FIGS. 3A and 3B) that indicates the speed of combustion of the fuel in the cylinder 14' based on the in-cylinder pressure P, the target value of the fuel injection amount feedback control is set at the value λt (>1.0) leaner than the theoretical air-fuel ratio (at which the excess air ratio is 1).

Thus, the controller for an internal combustion engine according to the second embodiment can calculate the combustion speed parameter that more clearly reflects the differences in property between the fuels Fa, Fb, Fc, Fd and Fe than in the example where the target value of the fuel injection amount feedback control is set at the theoretical air-fuel ratio (at which the excess air ratio is 1) when the combustion speed parameter that indicates the speed of combustion of the fuel in the cylinder 14' is calculated based on the in-cylinder pressure P.

That is, with the controller for an internal combustion engine according to the second embodiment, compared with the example where the target value of the fuel injection amount feedback control is set at the theoretical air-fuel ratio (at which the excess air ratio is 1) when the combustion speed parameter that indicates the speed of combustion of the fuel in the cylinder 14' is calculated based on the in-cylinder pressure P, for example, the difference between the combustion speed parameter of the fuel Fa and the combustion speed parameter of the fuel Fb having a different property than the fuel Fa can be increased, so that the resolution for discriminating the fuels Fa and Fb having different properties can be improved.

On the other hand, if the excess air ratio fixed when the fuel property learning is performed is set at the combustion limit excess air ratio of the fuel Fe having a high combustion speed, for example, there is a possibility that, when the fuel property learning is performed for the fuel Fa having a low combustion speed, the combustion of the fuel Fa is unstable and the fuel property learning cannot be appropriately performed for the fuel Fa.

In view of this, with the controller for an internal combustion engine according to the second embodiment, when the fuel injection amount feedback control is being performed to calculate the combustion speed parameter that indicates the speeds of combustion of the fuels Fa, Fb, Fc, Fd and Fe in the cylinder 14' based on the in-cylinder pressure P, the target value of the fuel injection amount feedback control is set at a value of the excess air ratio richer than the combustion limit excess air ratios of the fuels Fa, Fb, Fc, Fd and Fe (that is, a value of the excess air ratio richer than the combustion limit excess air ratio of the richest fuel Fa).

Thus, the controller for an internal combustion engine according to the second embodiment can reduce the possibility that unstable combustion occurs compared with the example where the target value of the fuel injection amount feedback control is set at the combustion limit excess air ratio when the combustion speed parameter that indicates the speeds of combustion of the fuels Fa, Fb, Fc, Fd and Fe in the cylinder 14' is calculated based on the in-cylinder pressure P.

That is, the controller for an internal combustion engine according to the second embodiment can reduce the possibility that unstable combustion occurs when the fuel injection amount feedback control is being performed to calculate the combustion speed parameter of the fuel Fa having a low combustion speed.

Figure 9:
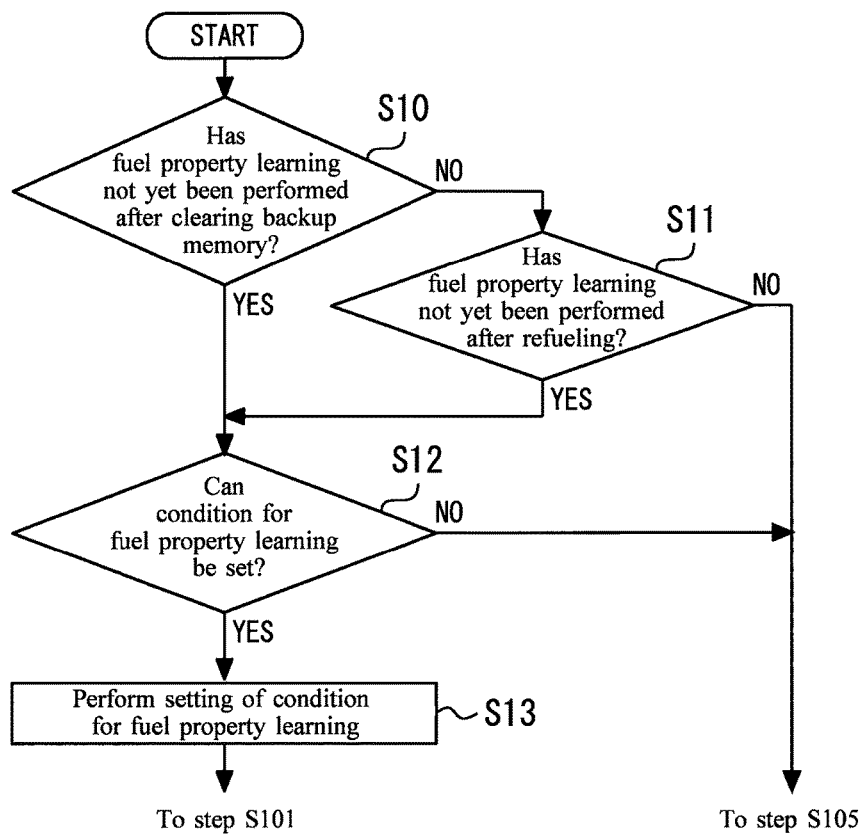
FIG. 9 is a flowchart for illustrating a fuel injection amount control performed by a controller for an internal combustion engine according to a second embodiment to perform the lean burn operation.

FIG. 9 is a flowchart for illustrating a fuel injection amount control performed by the controller for an internal combustion engine according to the second embodiment to perform the lean burn operation.

When performing the lean burn operation, the controller for an internal combustion engine according to the second embodiment starts the process shown in FIG. 9. First, in Step S10, for example, the backup memory of the ECU 40 is cleared to erase the combustion limit excess air ratio and the combustion limit combustion speed parameter having been stored in the backup memory, and then, the ECU 40 determines whether the fuel property learning has not yet been performed. If an affirmative determination is made, the process proceeds to Step S12. If a negative determination is made, the process proceeds to Step S11.

In Step S11, for example, the ECU 40 determines whether the fuel property learning has not yet been performed after refueling or not. If an affirmative determination is made, the process proceeds to Step S12. If a negative determination is made, the process proceeds to Step S105 in FIG. 4.

That is, with the controller for an internal combustion engine according to the second embodiment, whether the fuel property learning needs to be performed or not is determined in Steps S10 and S11, and the process proceeds to Step S12 if the fuel property learning needs to be performed and proceeds to Step S105 in FIG. 4 if the fuel property learning does not need to be performed.

More specifically, when the process proceeds to Step S105 in FIG. 4 without performing the fuel property learning, the lean burn operation is not performed in Step S105 in FIG. 4.

In Step S12, for example, the ECU 40 determines whether the condition for the fuel property learning can be set or not.

More specifically, in Step S12, it is determined whether or not the target value of the fuel injection amount feedback control can be set at the value λt of the excess air ratio that is leaner than the theoretical air-fuel ratio and richer than the combustion limit excess air ratio in order to perform the fuel injection amount feedback control in which the combustion speed parameter that indicates the speed of combustion of the fuel in the cylinder 14' is calculated based on the in-cylinder pressure P and the fuel property learning is performed.

If an affirmative determination is made, the process proceeds to Step S13. If a negative determination is made, the process proceeds to Step S105 in FIG. 4. For example, when warming up of the internal combustion engine 10 is yet to be completed, a negative determination is made in Step S12, and the fuel property learning is not performed.

In Step S13, for example, the ECU 40 performs setting of the condition for the fuel property learning.

More specifically, in Step S13, the target value of the fuel injection amount feedback control is set at the value λt of the excess air ratio that is leaner than the theoretical air-fuel ratio and richer than the combustion limit excess air ratio in order to perform the fuel injection amount feedback control in which the combustion speed parameter that indicates the speed of combustion of the fuel in the cylinder 14' is calculated based on the in-cylinder pressure P and the fuel property learning is performed.

Then, in Step S101 in FIG. 4, while the fuel injection amount feedback control is being performed with the target value of the fuel injection amount feedback control being set at the value λt leaner than the theoretical air-fuel ratio and richer than the combustion limit excess air ratio, the combustion speed parameter calculating section 40a calculates the combustion speed parameter (see the horizontal axes of FIGS. 3A and 3B) that indicates the speed of combustion of the fuel in the cylinder 14' based on the in-cylinder pressure P, and the fuel property learning is performed.

More specifically, the fuel combustion speed during the fuel injection amount feedback control for performing the fuel property learning is greater than the fuel combustion speed during the fuel injection amount feedback control after the fuel property learning is performed.

In the following, a controller for an internal combustion engine according to a third embodiment of the present disclosure will be described.

The controller for an internal combustion engine according to the third embodiment has basically the same configuration as the controller for an internal combustion engine according to the first embodiment described above except for the points described below. Thus, the controller for an internal combustion engine according to the third embodiment has basically the same effects as the controller for an internal combustion engine according to the first embodiment described above except for the points described below.

Figure 10:
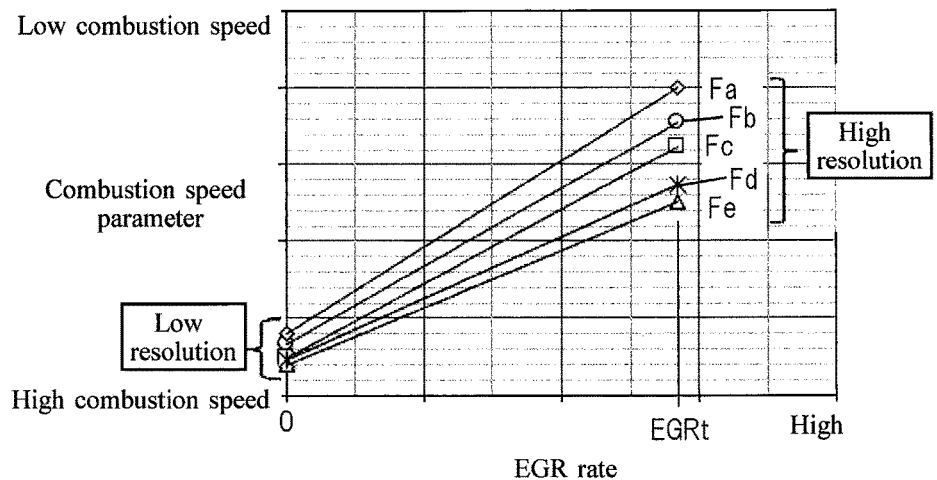
FIG. 10 is a graph for illustrating the effect of fixing the value of the EGR rate when determining the combustion speed of the fuel.

FIG. 10 is a graph for illustrating the effect of fixing the value of the EGR rate when determining the combustion speed of the fuel. In FIG. 10, the horizontal axis indicates the EGR rate fixed as the target value of the EGR rate feedback control when the fuel property learning is performed, and the vertical axis indicates the combustion speed parameter.

As described above, in the example shown in FIG. 6 in which the controller for an internal combustion engine according to the first embodiment is used, the fuel property learning is performed in Step S201. More specifically, in Step S201, the EGR rate feedback control is performed with the EGR rate as the target value of the EGR rate feedback control being fixed at a preset value, and while the EGR rate feedback control is being performed, the combustion speed parameter that indicates the fuel combustion speed, such as the crank angle interval (SA-CA10), is calculated.

When the fuel property learning is performed, as shown in FIG. 10, if the value of the EGR rate as the target value of the EGR rate feedback control is fixed at zero, the fuels Fa, Fb, Fc, Fd and Fe have greater combustion speeds than if the EGR rate as the target value of the EGR rate feedback control is fixed at a value EGRt greater than zero. That is, if the value of the EGR rate as the target value of the EGR rate feedback control is fixed at zero, the required times for combustion of the fuels Fa, Fb, Fc, Fd and Fe are shorter than if the EGR rate as the target value of the EGR rate feedback control is fixed at the value EGRt greater than zero. Thus, the differences in required time for combustion between the fuels Fa, Fb, Fc, Fd and Fe are smaller.

As a result, when the fuel property learning is performed, as shown in FIG. 10, if the value of the EGR rate as the target value of the EGR rate feedback control is fixed at zero, the resolution for discriminating between the combustion speeds of the fuels Fa, Fb, Fc, Fd and Fe is lower than if the EGR rate as the target value of the EGR rate feedback control is fixed at the value EGRt greater than zero.

On the other hand, when the fuel property learning is performed, as shown in FIG. 10, if the EGR rate as the target value of the EGR rate feedback control is fixed at the value EGRt greater than zero, the combustion speeds of the fuels Fa, Fb, Fc, Fd and Fe are lower than if the value of the EGR rate is fixed at zero. That is, the required times for combustion of the fuels Fa, Fb, Fc, Fd and Fe are longer. Thus, the differences in required time for combustion between the fuels Fa, Fb, Fc, Fd and Fe are larger.

As a result, when the fuel property learning is performed, as shown in FIG. 10, if the EGR rate as the target value of the EGR rate feedback control is fixed at the value EGRt greater than zero, the resolution for discriminating between the combustion speeds of the fuels Fa, Fb, Fc, Fd and Fe is higher than if the value of the EGR rate is fixed at zero.

In view of the points described above, with the controller for an internal combustion engine according to the third embodiment, when the fuel property learning is performed, that is, when the EGR rate feedback control is being performed to calculate the combustion speed parameter (see the horizontal axes of FIGS. 5A and 5B) that indicates the speed of combustion of the fuel in the cylinder 14' based on the in-cylinder pressure P, the target value of the EGR rate feedback control is set at the value EGRt greater than zero.

Thus, the controller for an internal combustion engine according to the third embodiment can calculate the combustion speed parameter that more clearly reflects the differences in property between the fuels Fa, Fb, Fc, Fd and Fe than in the example where the target value of the EGR rate feedback control is set at an EGR rate of 0 when the combustion speed parameter that indicates the speed of combustion of the fuel in the cylinder 14' is calculated based on the in-cylinder pressure P.

That is, with the controller for an internal combustion engine according to the third embodiment, compared with the example where the target value of the EGR rate feedback control is set at an EGR rate of 0 when the combustion speed parameter that indicates the speed of combustion of the fuel in the cylinder 14' is calculated based on the in-cylinder pressure P, for example, the difference between the combustion speed parameter of the fuel Fa and the combustion speed parameter of the fuel Fb having a different property than the fuel Fa can be increased, so that the resolution for discriminating the fuels Fa and Fb having different properties can be improved.

On the other hand, if the EGR rate fixed when the fuel property learning is performed is set at the combustion limit EGR rate of the fuel Fe having a high combustion speed, for example, when the fuel property learning is performed for the fuel Fa having a low combustion speed, there is a possibility that the combustion of the fuel Fa becomes unstable and the fuel property learning cannot be appropriately performed for the fuel Fa.

In view of this, with the controller for an internal combustion engine according to the third embodiment, when the EGR rate feedback control is being performed to calculate the combustion speed parameter that indicates the speeds of combustion of the fuels Fa, Fb, Fc, Fd and Fe in the cylinder 14' based on the in-cylinder pressure P, the target value of the EGR rate feedback control is set at a value of the EGR rate smaller than the combustion limit EGR rates of the fuels Fa, Fb, Fc, Fd and Fe (that is, a value of the EGR rate smaller than the combustion limit EGR rate of the fuel Fa having the lowest combustion limit EGR rate).

Thus, the controller for an internal combustion engine according to the third embodiment can reduce the possibility that unstable combustion occurs compared with the example where the target value of the EGR rate feedback control is set at the combustion limit EGR rate when the combustion speed parameter that indicates the speeds of combustion of the fuels Fa, Fb, Fc, Fd and Fe in the cylinder 14' is calculated based on the in-cylinder pressure P.

That is, the controller for an internal combustion engine according to the third embodiment can reduce the possibility that unstable combustion occurs when the EGR rate feedback control is being performed to calculate the combustion speed parameter of the fuel Fa having a low combustion speed.

Figure 11:
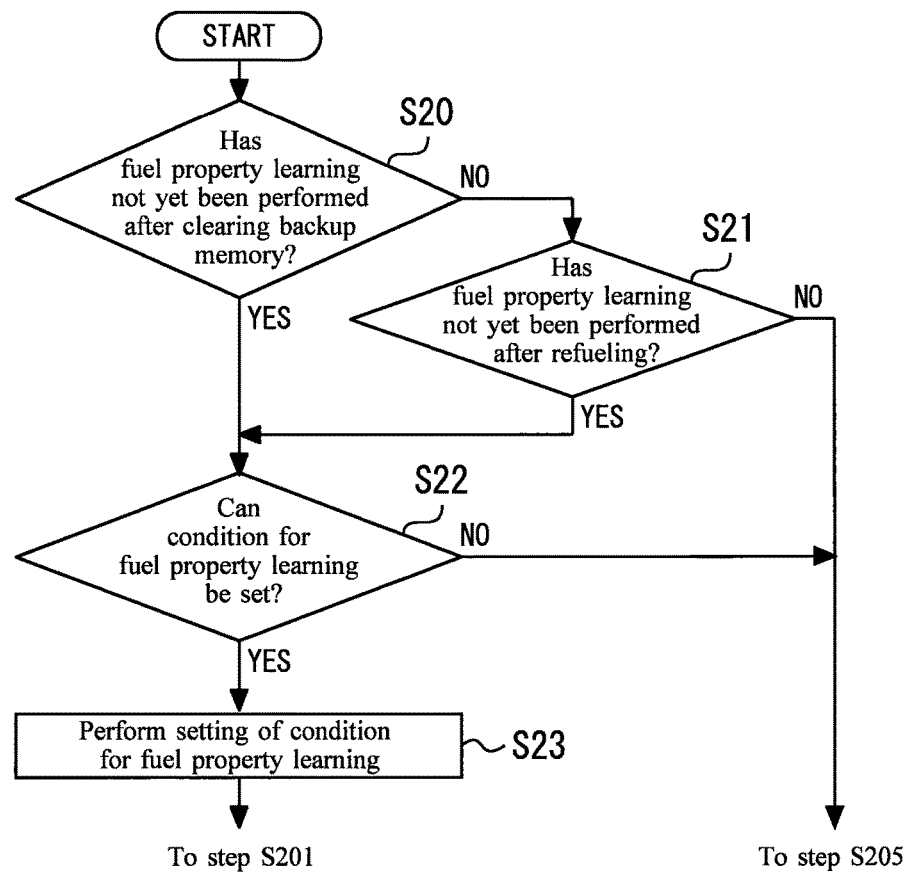
FIG. 11 is a flowchart for illustrating an EGR valve control performed by a controller for an internal combustion engine according to a third embodiment to perform the EGR operation.

FIG. 11 is a flowchart for illustrating an EGR valve control performed by the controller for an internal combustion engine according to the third embodiment to perform the EGR operation.

When performing the EGR operation, the controller for an internal combustion engine according to the third embodiment starts the process shown in FIG. 11. First, in Step S20, for example, the backup memory of the ECU 40 is cleared to erase the combustion limit EGR rate and the combustion limit combustion speed parameter having been stored in the backup memory, and then, the ECU 40 determines whether the fuel property learning has not yet been performed. If an affirmative determination is made, the process proceeds to Step S22. If a negative determination is made, the process proceeds to Step S21.

In Step S21, for example, the ECU 40 determines whether the fuel property learning has not yet been performed after refueling or not. If an affirmative determination is made, the process proceeds to Step S22. If a negative determination is made, the process proceeds to Step S205 in FIG. 6.

That is, with the controller for an internal combustion engine according to the third embodiment, whether the fuel property learning needs to be performed or not is determined in Steps S20 and S21, and the process proceeds to Step S22 if the fuel property learning needs to be performed and proceeds to Step S205 in FIG. 6 if the fuel property learning does not need to be performed.

More specifically, when the process proceeds to Step S205 in FIG. 6 without performing the fuel property learning, the EGR operation to increase the EGR rate is not performed in Step S205 in FIG. 6.

In Step S22, for example, the ECU 40 determines whether the condition for the fuel property learning can be set or not.

More specifically, in Step S22, it is determined whether or not the target value of the EGR rate feedback control can be set at the value EGRt of the EGR rate that is greater than zero and smaller than the combustion limit EGR rate in order to perform the EGR rate feedback control in which the combustion speed parameter that indicates the speed of combustion of the fuel in the cylinder 14' is calculated based on the in-cylinder pressure P and the fuel property learning is performed.

If an affirmative determination is made, the process proceeds to Step S23. If a negative determination is made, the process proceeds to Step S205 in FIG. 6. For example, when the warming up of the internal combustion engine 10 is yet to be completed, a negative determination is made in Step S22, and the fuel property learning is not performed.

In Step S23, for example, the ECU 40 performs setting of the condition for the fuel property learning.

More specifically, in Step S23, the target value of the EGR rate feedback control is set at the value EGRt of the EGR rate that is greater than zero and smaller than the combustion limit EGR rate in order to perform the EGR rate feedback control in which the combustion speed parameter that indicates the speed of combustion of the fuel in the cylinder 14' is calculated based on the in-cylinder pressure P and the fuel property learning is performed.

Then, in Step S201 in FIG. 6, while the EGR rate feedback control is being performed with the target value of the EGR rate feedback control being set at the value EGRt greater than zero and smaller than the combustion limit EGR rate, the combustion speed parameter calculating section 40*a* calculates the combustion speed parameter (see the horizontal axes of FIGS. 5A and 5B) that indicates the speed of combustion of the fuel in the cylinder 14' based on the in-cylinder pressure P, and the fuel property learning is performed.

More specifically, the fuel combustion speed during the EGR rate feedback control for performing the fuel property learning is greater than the fuel combustion speed during the EGR rate feedback control after the fuel property learning is performed.

According to a fourth embodiment, any of the first to third embodiments described above and the examples described above can be appropriately combined.

What is claimed is:

1. A controller for an internal combustion engine, the internal combustion engine including:
    a cylinder;
    an in-cylinder pressure sensor configured to detect an in-cylinder pressure in the cylinder; and
    a fuel injection valve,
    the internal combustion engine being configured to perform a lean burn operation,
    the controller being configured to:
    calculate a combustion speed parameter that indicates a speed of combustion of a fuel in the cylinder based on the in-cylinder pressure;
    perform at least one of a fuel injection amount feedforward control based on a combustion limit excess air ratio that is a target value of the fuel injection amount feedforward control, and a fuel injection amount feedback control based on a combustion limit combustion speed parameter that indicates a speed of combustion of the fuel in the cylinder corresponding to a combustion limit, the combustion limit combustion speed parameter being a target value of the fuel injection amount feedback control; and
    perform, when the speed of combustion of the fuel in the cylinder changes as a property of the fuel injected from the fuel injection valve changes, at least one of a change of the combustion limit excess air ratio according to a first relationship that the combustion limit excess air ratio increases as the speed of combustion of the fuel in the cylinder increases and a change of a value of the combustion limit combustion speed parameter according to a second relationship that the speed of combustion of the fuel in the cylinder corresponding to the combustion limit increases as the speed of combustion of the fuel in the cylinder increases.

2. The controller according to claim 1,
    wherein the controller is configured, when the fuel injection amount feedback control is being performed with the target value of the fuel injection amount feedback control being set at a value of an excess air ratio that is leaner than a theoretical air-fuel ratio, to calculate the combustion speed parameter based on the in-cylinder pressure.

3. The controller according to claim 2,
wherein the target value of the fuel injection amount feedback control is set at a value of the excess air ratio that is richer than the combustion limit excess air ratio.

4. The controller according to claim 1,
wherein the controller is configured, each time refueling is performed, to calculate the combustion speed parameter based on the in-cylinder pressure and to calculate the combustion limit excess air ratio according to the first relationship.

5. The controller according to claim 1,
wherein the controller is configured, each time a preset period in which there is a possibility that the property of the fuel injected from the fuel injection valve changes has elapsed since a last stop of the internal combustion engine, to calculate the combustion speed parameter based on the in-cylinder pressure and to calculate the combustion limit excess air ratio according to the first relationship.

6. The controller according to claim 1,
wherein the controller is configured, each time refueling is performed, to calculate the combustion speed parameter based on the in-cylinder pressure and to calculate the combustion limit combustion speed parameter according to the second relationship.

7. The controller according to claim 1,
wherein the controller is configured, each time a preset period in which there is a possibility that the property of the fuel injected from the fuel injection valve changes has elapsed since a last stop of the internal combustion engine, to calculate the combustion speed parameter based on the in-cylinder pressure and to calculate the combustion limit combustion speed parameter according to the second relationship.

8. A controller for an internal combustion engine, the internal combustion engine including:
a cylinder;
an intake channel connected to the cylinder;
an exhaust channel connected to the cylinder;
an EGR channel connecting the intake channel and the exhaust channel to each other;
an EGR valve disposed in the EGR channel;
an in-cylinder pressure sensor configured to detect an in-cylinder pressure in the cylinder; and
a fuel injection valve, and
the internal combustion engine being configured to perform an EGR operation,
the controller being configured to:
calculate a combustion speed parameter that indicates a speed of combustion of a fuel in the cylinder based on the in-cylinder pressure;
perform at least one of an EGR rate feedforward control based on a combustion limit EGR rate that is a target value of the EGR rate feedforward control and is greater than zero, and an EGR rate feedback control based on a combustion limit combustion speed parameter that indicates a speed of combustion of the fuel in the cylinder corresponding to a combustion limit and that corresponds to an EGR rate greater than zero, the combustion limit combustion speed parameter being a target value of the EGR rate feedback control; and
perform, when the speed of combustion of the fuel in the cylinder changes as a property of the fuel injected from the fuel injection valve changes, at least one of a change of the combustion limit EGR rate according to a third relationship that the combustion limit EGR rate increases as the speed of combustion of the fuel in the cylinder increases and a change of a value of the combustion limit combustion speed parameter according to a fourth relationship that the speed of combustion of the fuel in the cylinder corresponding to the combustion limit increases as the speed of combustion of the fuel in the cylinder increases.

9. The controller according to claim 8,
wherein the controller is configured, when the EGR rate feedback control is being performed with the target value of the EGR rate feedback control being set at a value of an EGR rate that is greater than zero, to calculate the combustion speed parameter based on the in-cylinder pressure.

10. The controller according to claim 9,
wherein the target value of the EGR rate feedback control is set at a value of the EGR rate that is smaller than the combustion limit EGR rate.

11. The controller according to claim 8,
wherein the controller is configured, each time refueling is performed, to calculate the combustion speed parameter based on the in-cylinder pressure and to calculate the combustion limit EGR rate according to the third relationship.

12. The controller according to claim 8,
wherein the controller is configured, each time a preset period in which there is a possibility that the property of the fuel injected from the fuel injection valve changes has elapsed since a last stop of the internal combustion engine, to calculate the combustion speed parameter based on the in-cylinder pressure and to calculate the combustion limit EGR rate according to the third relationship.

13. The controller according to claim 8,
wherein the controller is configured, each time refueling is performed, to calculate the combustion speed parameter based on the in-cylinder pressure and to calculate the combustion limit combustion speed parameter according to the fourth relationship.

14. The controller according to claim 8,
wherein the controller is configured, each time a preset period in which there is a possibility that the property of the fuel injected from the fuel injection valve changes has elapsed since a last stop of the internal combustion engine, to calculate the combustion speed parameter based on the in-cylinder pressure and to calculate the combustion limit combustion speed parameter according to the fourth relationship.

* * * * *